(12) United States Patent
Worthen et al.

(10) Patent No.: US 8,527,604 B2
(45) Date of Patent: Sep. 3, 2013

(54) MANAGED RICH MEDIA SYSTEM AND METHOD

(75) Inventors: Bill Worthen, Minnetonka, MN (US); Corey Ford, Prior Lake, MN (US); Andy McClure, Apple Valley, MN (US); Dean Hillesheim, Minnetonka, MN (US); Tim Kost, Farmington, MN (US)

(73) Assignee: Unity Works Media, Minneapolis, MN (US)

( * ) Notice: Subject to any disclaimer, the term of this patent is extended or adjusted under 35 U.S.C. 154(b) by 822 days.

(21) Appl. No.: 11/059,315

(22) Filed: Feb. 14, 2005

(65) Prior Publication Data

US 2005/0240596 A1 Oct. 27, 2005

Related U.S. Application Data

(60) Provisional application No. 60/544,110, filed on Feb. 12, 2004.

(51) Int. Cl.
*G06F 15/16* (2006.01)

(52) U.S. Cl.
USPC ........................................................ 709/217

(58) Field of Classification Search
USPC ........................... 709/203, 217–219, 225–226
See application file for complete search history.

(56) References Cited

U.S. PATENT DOCUMENTS

| | | | |
|---|---|---|---|
| 5,263,869 A | 11/1993 | Ziv-El | |
| 5,793,365 A | 8/1998 | Tang et al. | |
| 5,801,685 A | 9/1998 | Miller et al. | |
| 5,862,346 A | 1/1999 | Kley et al. | |
| 5,878,214 A | 3/1999 | Gilliam et al. | |
| 5,956,491 A | 9/1999 | Marks | |
| 5,974,446 A | 10/1999 | Sonnenreich et al. | |
| 5,999,968 A | 12/1999 | Tsuda | |
| 6,041,357 A * | 3/2000 | Kunzelman et al. | 709/228 |
| 6,075,768 A * | 6/2000 | Mishra | 370/229 |
| 6,088,702 A | 7/2000 | Plantz et al. | |

(Continued)

FOREIGN PATENT DOCUMENTS

WO WO 01/58131 A2 8/2001
WO WO 2004/063840 A2 7/2004

OTHER PUBLICATIONS

Vendaria Envision Video E-mail, www.vendaria.com/solution/vmail, Jan. 21, 2004.

(Continued)

*Primary Examiner* — Alicia Baturay
(74) *Attorney, Agent, or Firm* — McDermott Will & Emery LLP

(57) ABSTRACT

A system and method for managing rich media content in a computer system. The method can comprise assembling rich media content at a first computer system; encoding the rich media content into a plurality of computer readable data formats; uploading the encoded rich media content from the user computer system to a second computer system; storing the uploaded rich media content at the second computer system; indexing the uploaded rich media content in a computer library; creating a flyer by matching and linking uploaded rich media content and an executable icon; and distributing the flyer to at least one recipient computer system in one of the plurality of computer readable data formats determined by the network computer system to be compatible with the at least one recipient computer system.

23 Claims, 15 Drawing Sheets

(56) References Cited

U.S. PATENT DOCUMENTS

| | | | |
|---|---|---|---|
| 6,119,147 | A | 9/2000 | Toomey et al. |
| 6,154,771 | A | 11/2000 | Rangan et al. |
| 6,209,100 | B1 | 3/2001 | Robertson et al. |
| 6,223,165 | B1 | 4/2001 | Lauffer |
| 6,332,175 | B1 | 12/2001 | Birrell et al. |
| 6,421,726 | B1 | 7/2002 | Kenner et al. |
| 6,496,856 | B1 | 12/2002 | Kenner et al. |
| 6,546,188 | B1 | 4/2003 | Ishii et al. |
| 6,581,075 | B1 | 6/2003 | Guturu et al. |
| 6,643,663 | B1 | 11/2003 | Dabney et al. |
| 6,654,930 | B1 | 11/2003 | Zhou et al. |
| 6,677,981 | B1 | 1/2004 | Mancuso et al. |
| 6,694,200 | B1 | 2/2004 | Naim et al. |
| 6,701,343 | B1 | 3/2004 | Kenyon |
| 6,732,101 | B1* | 5/2004 | Cook ............................... 707/10 |
| 6,760,916 | B2 | 7/2004 | Holtz et al. |
| 6,871,236 | B2* | 3/2005 | Fishman et al. ............. 709/246 |
| 7,290,057 | B2* | 10/2007 | Saunders et al. ............. 709/231 |
| 7,346,656 | B2 | 3/2008 | Worthen |
| 2001/0029501 | A1 | 10/2001 | Yokobori et al. |
| 2001/0056469 | A1 | 12/2001 | Oonuki |
| 2002/0023018 | A1 | 2/2002 | Kleinbaum |
| 2002/0023132 | A1 | 2/2002 | Tornabene et al. |
| 2002/0029179 | A1 | 3/2002 | Gruber et al. |
| 2002/0038299 | A1 | 3/2002 | Zernik et al. |
| 2002/0056119 | A1 | 5/2002 | Moynihan |
| 2002/0063732 | A1 | 5/2002 | Mansikkaiemi et al. |
| 2002/0073026 | A1 | 6/2002 | Grubert et al. |
| 2002/0077839 | A1 | 6/2002 | Siegel et al. |
| 2002/0091538 | A1 | 7/2002 | Schwartz et al. |
| 2002/0091725 | A1 | 7/2002 | Skok |
| 2002/0099654 | A1 | 7/2002 | Nair |
| 2002/0129089 | A1 | 9/2002 | Hedge et al. |
| 2002/0169797 | A1* | 11/2002 | Hegde et al. ............... 707/500.1 |
| 2002/0175917 | A1 | 11/2002 | Chakravarty et al. |
| 2003/0061114 | A1 | 3/2003 | Schwartz et al. |
| 2003/0088687 | A1* | 5/2003 | Begeja et al. ................. 709/231 |
| 2003/0182371 | A1 | 9/2003 | Worthen |
| 2003/0200145 | A1 | 10/2003 | Krassner et al. |
| 2004/0019648 | A1 | 1/2004 | Huynh et al. |
| 2004/0186902 | A1* | 9/2004 | Stewart ........................ 709/217 |
| 2004/0226048 | A1 | 11/2004 | Alpert et al. |
| 2004/0267899 | A1* | 12/2004 | Rahman et al. ............. 709/217 |
| 2005/0010635 | A1* | 1/2005 | Schwesig et al. ............. 709/203 |
| 2005/0240433 | A1 | 10/2005 | Schwartz et al. |
| 2005/0256780 | A1 | 11/2005 | Eldred |
| 2005/0256941 | A1 | 11/2005 | Armstrong et al. |
| 2006/0168064 | A1 | 7/2006 | Huynh et al. |
| 2007/0112676 | A1* | 5/2007 | Kontio et al. ................. 705/50 |
| 2008/0292265 | A1* | 11/2008 | Worthen ........................ 386/52 |
| 2008/0295130 | A1* | 11/2008 | Worthen ........................ 725/34 |

OTHER PUBLICATIONS

"Vendaria: Paving the Future of Web Marketing by Video", L. Sivitz, www.seattle24x7.com/up/vendaria.htm, Jul. 9, 2004.

Edmunds.com Photos and Video www.edmunds.com/used/2005/audi/at/100415318/photos.html, Dec. 8, 2005.

CarsDirect—How Does it Work, www.carsdirect.com/the_company/how_cdc_works, Dec. 8, 2005.

CarsDirect—Used Cars, www.carsdirect.com/used-cars/search, Dec. 8, 2005.

Kia—www.kia.com/amanti/amanti-views-flash.php, Dec. 8, 2005.

Autobytel.com—www.autobytel.com/content/research;vir/index.cfm/action/media;series-id.int/38677/media/photo, Dec. 8, 2005.

Streaming21.com—www.streaming21.com/xpdf/streaming21_platform.pdg, Dec. 8, 2005.

Kim, Amy Jo; "Community Building on the Web"; 2000; Peachpit Press; Chapters 1 and 2.

Website Print-Out: Intranet News, http://www.intranetjournal.com, 3 pgs.; Sep. 2002.

PCT International Search Report, PCT/US2008/064905, Filed May 27, 2008, 2 pages.

\* cited by examiner

MANAGED RICH MEDIA SYSTEM AND METHOD

RELATED APPLICATION

This application claims the benefit of U.S. Provisional Application No. 60/544,110, filed Feb. 12, 2004, which is incorporated herein by reference in its entirety.

COMPACT DISC

A compact disc containing codes and information describing a preferred embodiment of the invention is submitted herewith and is hereby incorporated by reference. The compact disc contains the following programs:

| TITLE | SIZE IN BYTES | CREATION DATE |
|---|---|---|
| Client\Uploader | | |
| Bandwidth.txt | 3,375 | Feb. 14, 2005 |
| CImage.txt | 16,331 | Feb. 14, 2005 |
| FlyerEditor.txt | 23,663 | Feb. 14, 2005 |
| frmMain.txt | 18,317 | Feb. 14, 2005 |
| Login.txt | 6,255 | Feb. 14, 2005 |
| Member.txt | 4,061 | Feb. 14, 2005 |
| StringFunctions.txt | 1,357 | Feb. 14, 2005 |
| Updater.txt | 19,433 | Feb. 14, 2005 |
| Uploader.txt | 4,620 | Feb. 14, 2005 |
| VideoEditor.txt | 34,827 | Feb. 14, 2005 |
| Client\Web-based video viewer | | |
| CSlideViewer.txt | 217,063 | Feb. 14, 2005 |
| CSlideViewerL.txt | 93,638 | Feb. 14, 2005 |
| Server\Email Distribution | | |
| Send2Friend.aspx.txt | 4,383 | Feb. 14, 2005 |
| Send2Friend.txt | 4,165 | Feb. 14, 2005 |
| Server\Video Processing | | |
| Bandwidth.asmx.txt | 1,773 | Feb. 14, 2005 |
| Security.asmx.txt | 4,018 | Feb. 14, 2005 |
| VideoProcessing.asmx.txt | 8,923 | Feb. 14, 2005 |
| Server\Web Client Diagnostics | | |
| BrowserCheck.txt | 22,415 | Feb. 14, 2005 |
| UW_Patent_Source | | |
| overview.txt | 2,048 | Feb. 14, 2005 |
| environments.config.txt | 504 | Feb. 14, 2005 |
| VideoEncoder.asmx.cs.txt | 3,850 | Feb. 14, 2005 |
| VideoEncoder.asmx.txt | 110 | Feb. 14, 2005 |
| Web.config.txt | 3,939 | Feb. 14, 2005 |
| UW_Patent_Source\FlashEncoderRoot\EncoderService | | |
| FlashEncoderService.cs.txt | 3,014 | Feb. 14, 2005 |
| ProjectInstaller.cs.txt | 2,055 | Feb. 14, 2005 |
| Watcher.cs.txt | 3,137 | Feb. 14, 2005 |
| UW_Patent_Source\FlashEncoderRoot\EncodingSchema | | |
| EncodingSchema.cs.txt | 4,417 | Feb. 14, 2005 |
| EncodingSchemas.cs.txt | 2,064 | Feb. 14, 2005 |
| UW_Patent_Source\FlashEncoderRoot\FlashEncoder | | |
| EncodingQueue.cs.txt | 4,750 | Feb. 14, 2005 |
| EncodingQueueItem.cs.txt | 12,630 | Feb. 14, 2005 |
| FlashEncoder.cs.txt | 8,718 | Feb. 14, 2005 |
| FlashService.cs.txt | 2,689 | Feb. 14, 2005 |
| SchemaProcessor.cs.txt | 5,213 | Feb. 14, 2005 |
| StreamingLocation.cs.txt | 1,852 | Feb. 14, 2005 |
| UploadQueueItem.cs.txt | 10,311 | Feb. 14, 2005 |
| VideoQueueItem.cs.txt | 10,784 | Feb. 14, 2005 |
| VideoUploadQueue.cs.txt | 4,375 | Feb. 14, 2005 |
| VideoViewerContent.cs.txt | 3,465 | Feb. 14, 2005 |
| UW_Patent_Source\FlashEncoderRoot\FlashFileUploader | | |
| FlashUploaderService.cs.txt | 3,045 | Feb. 14, 2005 |
| UW_Patent_Source\FlashEncoderRoot\FlixProfileEditor | | |
| ProfileEditorForm.cs.txt | 33,303 | Feb. 14, 2005 |
| UW_Patent_Source\FlashFileWatcher | | |
| DataHelper.cs.txt | 867 | Feb. 14, 2005 |
| FileSystemHelper.cs.txt | 2,344 | Feb. 14, 2005 |

-continued

| TITLE | SIZE IN BYTES | CREATION DATE |
|---|---|---|
| FlashHandler.cs.txt | 1,765 | Feb. 14, 2005 |
| FlashService.cs.txt | 2,572 | Feb. 14, 2005 |
| FlashWatcherInstall.bat.txt | 203 | Feb. 14, 2005 |
| MailHelper.cs.txt | 1,355 | Feb. 14, 2005 |
| ProjectInstaller.cs.txt | 1,953 | Feb. 14, 2005 |
| RegistryHelper.cs.txt | 3,089 | Feb. 14, 2005 |
| StreamingLocation.cs.txt | 1,234 | Feb. 14, 2005 |
| VideoQueueItem.cs.txt | 10,784 | Feb. 14, 2005 |
| VideoUploadQueue.cs.txt | 5,232 | Feb. 14, 2005 |
| VideoViewerContent.cs.txt | 3,365 | Feb. 14, 2005 |
| Watcher.cs.txt | 3,122 | Feb. 14, 2005 |
| UW_Patent_Source\FLVPlayer | | |
| flash_diagnostic.txt.txt | 12,079 | Feb. 14, 2005 |
| flashplayer.txt.txt | 12,594 | Feb. 14, 2005 |
| UW_Patent_Source\Ftp.root | | |
| TestFTPClient.cs.txt | 2,391 | Feb. 14, 2005 |
| UW_Patent_Source\Ftp.root\FTPClient | | |
| FTPClient.cs.txt | 37,040 | Feb. 14, 2005 |
| FTPControlSocket.cs.txt | 15,489 | Feb. 14, 2005 |
| FTPException.cs.txt | 2,593 | Feb. 14, 2005 |
| FTPReply.cs.txt | 2,561 | Feb. 14, 2005 |
| UW_Patent_Source\Ftp.root\TestFtpClient | | |
| TestFTPClient.cs.txt | 3,047 | Feb. 14, 2005 |
| UW_Patent_Source\Help_Modules\diagLogging | | |
| logging.aspx.cs.txt | 5,797 | Feb. 14, 2005 |
| logging.aspx.txt | 115 | Feb. 14, 2005 |
| UW_Patent_Source\Help_Modules\FlashHelp | | |
| index.aspx.cs.txt | 2,293 | Feb. 14, 2005 |
| index.aspx.txt | 11,100 | Feb. 14, 2005 |
| index.htm.txt | 10,747 | Feb. 14, 2005 |
| test.html.txt | 174 | Feb. 14, 2005 |
| upgrade_flash.html.txt | 1,477 | Feb. 14, 2005 |
| Web.config.txt | 3,724 | Feb. 14, 2005 |
| UW_Patent_Source\Help_Modules\MediaPlayerHelp | | |
| ViewerHelp.aspx.cs.txt | 1,867 | Feb. 14, 2005 |
| ViewerHelp.aspx.txt | 10,983 | Feb. 14, 2005 |
| WebForm1.aspx.cs.txt | 1,033 | Feb. 14, 2005 |
| WebForm1.aspx.txt | 10,983 | Feb. 14, 2005 |
| UW_Patent_Source\Help_Modules\Uploader | | |
| faq_flyer.html.txt | 687 | Feb. 14, 2005 |
| Help.hhp.txt | 426 | Feb. 14, 2005 |
| login.html.txt | 890 | Feb. 14, 2005 |
| mgmntpage.html.txt | 556 | Feb. 14, 2005 |
| selectteam.html.txt | 429 | Feb. 14, 2005 |
| Table of Contents.hhc.txt | 1,939 | Feb. 14, 2005 |
| ulvsub1_encode.html.txt | 658 | Feb. 14, 2005 |
| ulvsub2_uploadsav.html.txt | 2,223 | Feb. 14, 2005 |
| ulvsub3_preview.html.txt | 590 | Feb. 14, 2005 |
| uploadflyer.html.txt | 1,565 | Feb. 14, 2005 |
| Welcome.html.txt | 3,092 | Feb. 14, 2005 |
| whatsnew.html.txt | 1,053 | Feb. 14, 2005 |
| UW_Patent_Source\HelpersRoot\DBScriptUtil | | |
| DBUtil.cs.txt | 5,457 | Feb. 14, 2005 |
| DBUtilForm.cs.txt | 3,829 | Feb. 14, 2005 |
| UW_Patent_Source\HelpersRoot\Helpers | | |
| DataHelper.cs.txt | 1,104 | Feb. 14, 2005 |
| FileHelper.cs.txt | 1,171 | Feb. 14, 2005 |
| FileSystemHelper.cs.txt | 3,114 | Feb. 14, 2005 |
| MailHelper.cs.txt | 3,068 | Feb. 14, 2005 |
| RegistryHelper.cs.txt | 5,006 | Feb. 14, 2005 |
| SoapHelper.cs.txt | 2,552 | Feb. 14, 2005 |
| SymmetricCrypto.cs.txt | 28,176 | Feb. 14, 2005 |
| UW_Patent_Source\MRAlib | | |
| MRALib.cs.txt | 17,683 | Feb. 14, 2005 |

-continued

| TITLE | SIZE IN BYTES | CREATION DATE |
|---|---|---|
| UW_Patent_Source\SecureVppConfig | | |
| ConfigForm.cs.txt | 12,729 | Feb. 14, 2005 |
| UW_Patent_Source\StreamingLogs.root\DeleteOrphans | | |
| App.config.txt | 646 | Feb. 14, 2005 |
| Main.cs.txt | 4,234 | Feb. 14, 2005 |
| UW_Patent_Source\StreamingLogs.root\SpeederaSync | | |
| App.config.txt | 1,078 | Feb. 14, 2005 |
| Console.cs.txt | 354 | Feb. 14, 2005 |
| Main.cs.txt | 3,721 | Feb. 14, 2005 |
| UW_Patent_Source\StreamingLogs.root\StrearningLogs | | |
| BrowserDetector.cs.txt | 7,255 | Feb. 14, 2005 |
| DirSync.cs.txt | 2,498 | Feb. 14, 2005 |
| FcsLogEntry.cs.txt | 6,067 | Feb. 14, 2005 |
| IPResolver.cs.txt | 6,326 | Feb. 14, 2005 |
| LogEntry.cs.txt | 7,165 | Feb. 14, 2005 |
| LogFile.cs.txt | 5,511 | Feb. 14, 2005 |
| LogTable.cs.txt | 5,673 | Feb. 14, 2005 |
| StreamingProvider.cs.txt | 8,694 | Feb. 14, 2005 |
| WmsLogEntry.cs.txt | 4,558 | Feb. 14, 2005 |
| UW_Patent_Source\StreamingLogs.root\StreamingLogsTest | | |
| BrowserDetectorTest.cs.txt | 3,424 | Feb. 14, 2005 |
| FcsLogEntryTest.cs.txt | 5,015 | Feb. 14, 2005 |
| LogFileTest.cs.txt | 3,486 | Feb. 14, 2005 |
| logTableTest.cs.txt | 5,544 | Feb. 14, 2005 |
| StreamingProviderTest.cs.txt | 3,428 | Feb. 14, 2005 |
| TestWmvLogEntry.cs.txt | 4,706 | Feb. 14, 2005 |
| UW_Patent_Source\TestFlashWebService\TestFlashWebService | | |
| Form1.cs.txt | 6,445 | Feb. 14, 2005 |
| UW_Patent_Source\TreeView\TreeView | | |
| Form1.cs.txt | 6,258 | Feb. 14, 2005 |
| UW_Patent_Source\UnityTools.com | | |
| _inc_CidPidVid.asp.txt | 1,426 | Feb. 14, 2005 |
| _Inc_Common.asp.txt | 8,044 | Feb. 14, 2005 |
| _inc_common2.asp.txt | 14,751 | Feb. 14, 2005 |
| _Inc_FlowControl.asp.txt | 409 | Feb. 14, 2005 |
| about.asp.txt | 1,573 | Feb. 14, 2005 |
| asx.asp.txt | 1,259 | Feb. 14, 2005 |
| asx.aspx.cs.txt | 5,032 | Feb. 14, 2005 |
| asx.aspx.txt | 105 | Feb. 14, 2005 |
| AuthCheck.xslt.txt | 1,340 | Feb. 14, 2005 |
| av.asp.txt | 9,904 | Feb. 14, 2005 |
| BrowserCheck.asp.txt | 22,479 | Feb. 14, 2005 |
| BrowserCheck2.asp.txt | 2,792 | Feb. 14, 2005 |
| CidPidVid.asp.txt | 1,148 | Feb. 14, 2005 |
| CidPidVid.inc.txt | 1,148 | Feb. 14, 2005 |
| comingSoon.htm.txt | 142 | Feb. 14, 2005 |
| common.inc.txt | 14,498 | Feb. 14, 2005 |
| commonFunctions.asp.txt | 1,011 | Feb. 14, 2005 |
| contact.asp.txt | 460 | Feb. 14, 2005 |
| Copy of default.asp.txt | 12,326 | Feb. 14, 2005 |
| Copy of order.asp.txt | 24,337 | Feb. 14, 2005 |
| Copy of welcome.htm.txt | 969 | Feb. 14, 2005 |
| CustLibView.asp.txt | 1,178 | Feb. 14, 2005 |
| db.cs.txt | 2,916 | Feb. 14, 2005 |
| dbcm-law.htm.txt | 2,642 | Feb. 14, 2005 |
| default.asp.txt | 1,698 | Feb. 14, 2005 |
| default.css.txt | 12,046 | Feb. 14, 2005 |
| Default.vsdisco.txt | 269 | Feb. 14, 2005 |
| default_offline.asp.txt | 148 | Feb. 14, 2005 |
| demoflyer.htm.txt | 14,694 | Feb. 14, 2005 |
| empty.htm.txt | 282 | Feb. 14, 2005 |
| flyer.asp.txt | 134 | Feb. 14, 2005 |
| flyer.aspx.cs.txt | 6,153 | Feb. 14, 2005 |
| flyer.aspx.txt.txt | 1,832 | Feb. 14, 2005 |
| help.htm.txt | 578 | Feb. 14, 2005 |
| intro.asp.txt | 1,139 | Feb. 14, 2005 |
| jesus.asp.txt | 1,606 | Feb. 14, 2005 |
| killcookies.asp.txt | 153 | Feb. 14, 2005 |
| order.asp.txt | 29,550 | Feb. 14, 2005 |

| TITLE | SIZE IN BYTES | CREATION DATE |
|---|---|---|
| orderFunctions.asp.txt | 2,202 | Feb. 14, 2005 |
| orderList.asp.txt | 1,737 | Feb. 14, 2005 |
| pageHeaders.asp.txt | 452 | Feb. 14, 2005 |
| PicView.asp.txt | 562 | Feb. 14, 2005 |
| prb error when you debug com+ in the vb ide | 204 | Feb. 14, 2005 |
| press.asp.txt | 355 | Feb. 14, 2005 |
| print.html.bak.txt | 138 | Feb. 14, 2005 |
| print.html.txt | 164 | Feb. 14, 2005 |
| privacy.asp.txt | 383 | Feb. 14, 2005 |
| samplekingdomoil.htm.txt | 17,645 | Feb. 14, 2005 |
| SecureIframe.js.txt | 234 | Feb. 14, 2005 |
| SecureInclude.js.txt | 2,135 | Feb. 14, 2005 |
| services.asp.txt | 386 | Feb. 14, 2005 |
| statuses.xml.txt | 4,298 | Feb. 14, 2005 |
| team_legal.htm.txt | 2,887 | Feb. 14, 2005 |
| tempoffline.asp.txt | 346 | Feb. 14, 2005 |
| terms.asp.txt | 8,223 | Feb. 14, 2005 |
| test.asp.txt | 478 | Feb. 14, 2005 |
| test.html.bak.txt | 100 | Feb. 14, 2005 |
| test2.asp.txt | 263 | Feb. 14, 2005 |
| testFrame.htm.txt | 212 | Feb. 14, 2005 |
| TestVideo.htm.txt | 735 | Feb. 14, 2005 |
| testWebListView.htm.txt | 623 | Feb. 14, 2005 |
| ValidatePage.aspx.cs.txt | 4,384 | Feb. 14, 2005 |
| ValidatePage.aspx.txt | 123 | Feb. 14, 2005 |
| ValidPage.htm.txt | 1,199 | Feb. 14, 2005 |
| ValidPage1001.htm.txt | 1,183 | Feb. 14, 2005 |
| ValidPage1002.htm.txt | 1,255 | Feb. 14, 2005 |
| viewer2.html.txt | 6,871 | Feb. 14, 2005 |
| viewerHelp.asp.txt | 1,192 | Feb. 14, 2005 |
| visitorAdd.asp.txt | 4,863 | Feb. 14, 2005 |
| visitorAdopt.asp.txt | 3,300 | Feb. 14, 2005 |
| visitorList.asp.txt | 2,736 | Feb. 14, 2005 |
| VppConfig.aspx.cs.txt | 1,636 | Feb. 14, 2005 |
| VppConfig.aspx.txt | 1,463 | Feb. 14, 2005 |
| Web.config.txt | 2,610 | Feb. 14, 2005 |
| WebForm1.aspx.cs.txt | 985 | Feb. 14, 2005 |
| WebForm1.aspx.txt | 594 | Feb. 14, 2005 |
| WebListView.asp.txt | 9,155 | Feb. 14, 2005 |
| WebListView.htm.txt | 858 | Feb. 14, 2005 |
| WebListView2.htm.txt | 621 | Feb. 14, 2005 |
| WebMsgBrdView.asp.txt | 7,144 | Feb. 14, 2005 |
| WebPreview.asp.txt | 7,195 | Feb. 14, 2005 |
| WebPreview.htm.txt | 622 | Feb. 14, 2005 |
| WebPreview3.htm.txt | 886 | Feb. 14, 2005 |
| welcome.htm.txt | 3,819 | Feb. 14, 2005 |
| UW_Patent_Source\UnityTools.com\communities | | |
| messagelist.asp.txt | 148 | Feb. 14, 2005 |
| UW_Patent_Source\UnityTools.com\CustServ | | |
| _Inc_CustCommon.asp.txt | 209 | Feb. 14, 2005 |
| _Inc_FRACommon.asp.txt | 997 | Feb. 14, 2005 |
| _Inc_MRACommon.asp.txt | 1,308 | Feb. 14, 2005 |
| ActMaint.asp.txt | 161 | Feb. 14, 2005 |
| CSMain.asp.txt | 1,177 | Feb. 14, 2005 |
| CustAdd.asp.txt | 3,209 | Feb. 14, 2005 |
| CustMenu.asp.txt | 7,089 | Feb. 14, 2005 |
| FRAAdd.asp.txt | 3,209 | Feb. 14, 2005 |
| FRADetail.asp.txt | 6,872 | Feb. 14, 2005 |
| FRAQueue.asp.txt | 3,958 | Feb. 14, 2005 |
| MRADetail.asp.txt | 8,334 | Feb. 14, 2005 |
| MRAQueue.asp.txt | 3,019 | Feb. 14, 2005 |
| UW_Patent_Source\UnityTools.com\diagLogging | | |
| logging.aspx.cs.txt | 5,205 | Feb. 14, 2005 |
| logging.aspx.txt | 115 | Feb. 14, 2005 |
| test.html.txt | 533 | Feb. 14, 2005 |
| UW_Patent_Source\UnityTools.com\dotNet | | |
| AuthHeader.cs.txt | 1,028 | Feb. 14, 2005 |
| Bandwidth.asmx.cs.txt | 1,632 | Feb. 14, 2005 |
| Bandwidth.asmx.txt | 92 | Feb. 14, 2005 |
| db.cs.txt | 2,916 | Feb. 14, 2005 |
| Security.asmx.cs.txt | 3,526 | Feb. 14, 2005 |
| Security.asmx.txt | 90 | Feb. 14, 2005 |
| Send2Friend.aspx.cs.txt | 4,859 | Feb. 14, 2005 |

-continued

| TITLE | SIZE IN BYTES | CREATION DATE |
|---|---|---|
| Send2Friend.aspx.txt | 4,576 | Feb. 14, 2005 |
| VideoProcessing.asmx.cs.txt | 19,497 | Feb. 14, 2005 |
| VideoProcessing.asmx.txt | 104 | Feb. 14, 2005 |
| UW_Patent_Source\UnityTools.com\flashHelp | | |
| index.aspx.cs.txt | 2,444 | Feb. 14, 2005 |
| index.aspx.txt | 11,100 | Feb. 14, 2005 |
| UW_Patent_Source\UnityTools.com\help | | |
| FeedbackForm.aspx.cs.txt | 2,738 | Feb. 14, 2005 |
| FeedbackForm.aspx.txt | 2,599 | Feb. 14, 2005 |
| help.js.txt | 813 | Feb. 14, 2005 |
| HelpTree.aspx.cs.txt | 1,395 | Feb. 14, 2005 |
| HelpTree.aspx.txt | 3,158 | Feb. 14, 2005 |
| HelpTreeFrame.aspx.cs.txt | 1,174 | Feb. 14, 2005 |
| HelpTreeFrame.aspx.txt | 543 | Feb. 14, 2005 |
| HelpTreeNav.htm.txt | 941 | Feb. 14, 2005 |
| nodes.xml.txt | 2,146 | Feb. 14, 2005 |
| Thanks.aspx.cs.txt | 980 | Feb. 14, 2005 |
| Thanks.aspx.txt | 1,037 | Feb. 14, 2005 |
| UW_Patent_Source\UnityTools.com\help\pages | | |
| broadcast2members.html.txt | 604 | Feb. 14, 2005 |
| broadcastsendcustom.html.txt | 532 | Feb. 14, 2005 |
| broadcastsetcustom.htm.txt | 659 | Feb. 14, 2005 |
| broadcastsetcustom.html.txt | 653 | Feb. 14, 2005 |
| faq_broadcast.html.txt | 577 | Feb. 14, 2005 |
| faq_flyer.html.txt | 419 | Feb. 14, 2005 |
| faq_iframe.html.txt | 475 | Feb. 14, 2005 |
| faq_library.html.txt | 449 | Feb. 14, 2005 |
| faq_managementpage.html.txt | 493 | Feb. 14, 2005 |
| faq_send2friend.html.txt | 752 | Feb. 14, 2005 |
| faq_videomail.html.txt | 383 | Feb. 14, 2005 |
| faq_vpp.html.txt | 440 | Feb. 14, 2005 |
| help.css.txt | 160 | Feb. 14, 2005 |
| insert_iframe.html.txt | 682 | Feb. 14, 2005 |
| insert_mls.html.txt | 552 | Feb. 14, 2005 |
| insert_popup.html.txt | 703 | Feb. 14, 2005 |
| publish2vpp.html.txt | 697 | Feb. 14, 2005 |
| unpublishvideo.htm.txt | 881 | Feb. 14, 2005 |
| unpublishvideo.html.txt | 884 | Feb. 14, 2005 |
| UW_Patent_Source\UnityTools.com\imageLib | | |
| banner.aspx.cs.txt | 3,419 | Feb. 14, 2005 |
| banner.aspx.txt | 115 | Feb. 14, 2005 |
| button.aspx.cs.txt | 3,529 | Feb. 14, 2005 |
| button.aspx.txt | 586 | Feb. 14, 2005 |
| chooser.aspx.cs.txt | 30,865 | Feb. 14, 2005 |
| chooser.aspx.txt | 7,373 | Feb. 14, 2005 |
| chooser2.aspx.cs.txt | 15,349 | Feb. 14, 2005 |
| chooser2.aspx.txt | 5,440 | Feb. 14, 2005 |
| ChooserPrint.aspx.cs.txt | 2,848 | Feb. 14, 2005 |
| ChooserPrint.aspx.txt | 867 | Feb. 14, 2005 |
| CImage.cs.txt | 18,664 | Feb. 14, 2005 |
| ClientListBox.cs.txt | 955 | Feb. 14, 2005 |
| DomValidator.cs.txt | 12,438 | Feb. 14, 2005 |
| Login.aspx.cs.txt | 3,692 | Feb. 14, 2005 |
| Login.aspx.txt | 1,899 | Feb. 14, 2005 |
| thumb.aspx.cs.txt | 3,527 | Feb. 14, 2005 |
| thumb.aspx.txt | 117 | Feb. 14, 2005 |
| Web.config.txt | 4,342 | Feb. 14, 2005 |
| UW_Patent_Source\UnityTools.com\images | | |
| OnOff.html.txt | 1,228 | Feb. 14, 2005 |
| UW_Patent_Source\UnityTools.com\images\tabs | | |
| folder.html.txt | 3,227 | Feb. 14, 2005 |
| folder2.html.txt | 6,282 | Feb. 14, 2005 |
| subClearOff.html.txt | 1,419 | Feb. 14, 2005 |
| subClearOn.html.txt | 1,408 | Feb. 14, 2005 |
| subFolder.html.txt | 3,553 | Feb. 14, 2005 |
| subOffClear.html.txt | 1,419 | Feb. 14, 2005 |
| subOffOff.html.txt | 1,397 | Feb. 14, 2005 |
| subOffOn.html.txt | 1,386 | Feb. 14, 2005 |
| subOnClear.html.txt | 1,408 | Feb. 14, 2005 |
| subOnOff.html.txt | 1,386 | Feb. 14, 2005 |
| tabClearOff.html.txt | 1,419 | Feb. 14, 2005 |

-continued

| TITLE | SIZE IN BYTES | CREATION DATE |
|---|---|---|
| tabClearOn.html.txt | 1,316 | Feb. 14, 2005 |
| tabOffClear.html.txt | 1,419 | Feb. 14, 2005 |
| tabOffOff.html.txt | 1,575 | Feb. 14, 2005 |
| tabOffOn.html.txt | 1,386 | Feb. 14, 2005 |
| tabOnClear.html.txt | 1,408 | Feb. 14, 2005 |
| tabOnOff.html.txt | 1,386 | Feb. 14, 2005 |
| UW_Patent_Source\UnityTools.com\jscripts | | |
| | | |
| contentScript.js.txt | 4,163 | Feb. 14, 2005 |
| contentScript_old.js.txt | 3,542 | Feb. 14, 2005 |
| contentScript2.js.txt | 3,851 | Feb. 14, 2005 |
| UW_Patent_Source\UnityTools.com\RSS | | |
| | | |
| js.aspx.cs.txt | 1,645 | Feb. 14, 2005 |
| js.aspx.txt | 96 | Feb. 14, 2005 |
| rss.aspx.cs.txt | 3,150 | Feb. 14, 2005 |
| rss.aspx.txt | 218 | Feb. 14, 2005 |
| RSS.cs.txt | 8,532 | Feb. 14, 2005 |
| RSS2JavaScript.xslt.txt | 787 | Feb. 14, 2005 |
| rss-core.xsd.txt | 2,839 | Feb. 14, 2005 |
| TeamPool2RSS.xslt.txt | 1,465 | Feb. 14, 2005 |
| UW_Patent_Source\UnityTools.com\Tests | | |
| | | |
| TestFlyerAspx.cs.txt | 1,932 | Feb. 14, 2005 |
| UW_Patent_Source\UnityTools.com\treegen | | |
| | | |
| genresize.js.txt | 3,901 | Feb. 14, 2005 |
| TgToc.js.txt | 16,077 | Feb. 14, 2005 |
| UW_Patent_Source\UnityTools.com\unitytools | | |
| | | |
| asx.aspx.cs.txt | 4,685 | Feb. 14, 2005 |
| asx.aspx.txt | 105 | Feb. 14, 2005 |
| db.cs.txt | 2,107 | Feb. 14, 2005 |
| flyer.asp.txt | 1,108 | Feb. 14, 2005 |
| flyer.aspx.cs.txt | 7,512 | Feb. 14, 2005 |
| flyer.aspx.txt | 2,025 | Feb. 14, 2005 |
| UW_Patent_Source\UnityTools.com\uwm | | |
| | | |
| survey.html.txt | 9,836 | Feb. 14, 2005 |
| Web.config.txt | 3,724 | Feb. 14, 2005 |
| WebForm1.aspx.cs.txt | 2,991 | Feb. 14, 2005 |
| WebForm1.aspx.txt | 970 | Feb. 14, 2005 |
| UW_Patent_Source\UnityTools.com\vraInfo | | |
| | | |
| Content.cs.txt | 2,309 | Feb. 14, 2005 |
| ContentPool.cs.txt | 1,075 | Feb. 14, 2005 |
| Mra.cs.txt | 7,218 | Feb. 14, 2005 |
| MRALib.cs.txt | 29,934 | Feb. 14, 2005 |
| UW_Patent_Source\UnityTools.com\vraInfoWeb | | |
| | | |
| addVideo.aspx.cs.txt | 4,917 | Feb. 14, 2005 |
| addVideo.aspx.txt | 758 | Feb. 14, 2005 |
| addVideo.html.txt | 2,748 | Feb. 14, 2005 |
| addVideoForm.aspx.cs.txt | 5,238 | Feb. 14, 2005 |
| addVideoForm.aspx.txt | 3,634 | Feb. 14, 2005 |
| displayLabel.aspx.cs.txt | 2,992 | Feb. 14, 2005 |
| displayLabel.aspx.txt | 2,485 | Feb. 14, 2005 |
| Login.aspx.cs.txt | 6,448 | Feb. 14, 2005 |
| Login.aspx.txt | 2,200 | Feb. 14, 2005 |
| statuses.xml.txt | 4,298 | Feb. 14, 2005 |
| style.css.txt | 3,876 | Feb. 14, 2005 |
| vraInfo.aspx.cs.txt | 5,258 | Feb. 14, 2005 |
| vraInfo.aspx.txt | 1,420 | Feb. 14, 2005 |
| Web.config.txt | 4,056 | Feb. 14, 2005 |
| UW_Patent_Source\UnityTools.com\vraInfoWeb\vraInfo | | |
| | | |
| MRALib.cs.txt | 29,934 | Feb. 14, 2005 |
| UW_Patent_Source\UnityTools.com\vraInfoWeb\Web References\SecLogin | | |
| | | |
| Reference.cs.txt | 4,248 | Feb. 14, 2005 |
| security.disco.txt | 553 | Feb. 14, 2005 |
| UW_Patent_Source\UnityTools.com\xml | | |
| | | |
| blurb.aspx.cs.txt | 3,580 | Feb. 14, 2005 |
| blurb.aspx.txt | 102 | Feb. 14, 2005 |
| BlurbJavaScript.xslt.txt | 591 | Feb. 14, 2005 |
| blurbTest.htm.txt | 366 | Feb. 14, 2005 |

-continued

| TITLE | SIZE IN BYTES | CREATION DATE |
|---|---|---|
| chooser.aspx.cs.txt | 8,872 | Feb. 14, 2005 |
| chooser.aspx.txt | 3,541 | Feb. 14, 2005 |
| Copy of library.asp.txt | 2,091 | Feb. 14, 2005 |
| DummyEventLog.cs.txt | 321 | Feb. 14, 2005 |
| js.aspx.cs.txt | 3,202 | Feb. 14, 2005 |
| js.aspx.txt | 96 | Feb. 14, 2005 |
| library.asp.txt | 4,024 | Feb. 14, 2005 |
| Library.xslt.txt | 4,512 | Feb. 14, 2005 |
| linkLookup.aspx.cs.txt | 7,390 | Feb. 14, 2005 |
| linkLookup.aspx.txt | 3,279 | Feb. 14, 2005 |
| navbot.js.txt | 2,078 | Feb. 14, 2005 |
| OutlookSample.xml.txt | 666 | Feb. 14, 2005 |
| rss.aspx.cs.txt | 5,212 | Feb. 14, 2005 |
| rss.aspx.txt | 219 | Feb. 14, 2005 |
| RSS.cs.txt | 8,532 | Feb. 14, 2005 |
| RSS2JavaScript.xslt.txt | 769 | Feb. 14, 2005 |
| RSSNavJavaScript.xslt.txt | 2,325 | Feb. 14, 2005 |
| sampleViewer.xml.txt | 764 | Feb. 14, 2005 |
| sampleViewer.xslt.txt | 598 | Feb. 14, 2005 |
| TeamPool2RSS.xslt.txt | 2,211 | Feb. 14, 2005 |
| viewer.asp.txt | 295 | Feb. 14, 2005 |
| Web.config.txt | 2,603 | Feb. 14, 2005 |
| xml.vsdisco.txt | 321 | Feb. 14, 2005 |
| UW_Patent_Source\UnityTools.com\xslt | | |
| CPublish.xslt.txt | 8,536 | Feb. 14, 2005 |
| desiredResult.xml.txt | 1,867 | Feb. 14, 2005 |
| Library.spp.txt | 735 | Feb. 14, 2005 |
| Library.xslt.txt | 3,091 | Feb. 14, 2005 |
| PreLibrary.xslt.txt | 215 | Feb. 14, 2005 |
| Team_Library.xml.txt | 28,967 | Feb. 14, 2005 |
| UW_Patent_Source\UnityTools\AdminScripts | | |
| contftp.vbs.txt | 2,515 | Feb. 14, 2005 |
| pauseftp.vbs.txt | 2,508 | Feb. 14, 2005 |
| startftp.vbs.txt | 2,510 | Feb. 14, 2005 |
| stopftp.vbs.txt | 2,500 | Feb. 14, 2005 |
| UW_Patent_Source\UnityTools\CampaignCon | | |
| Test.cs.txt | 555 | Feb. 14, 2005 |
| UW_Patent_Source\UnityTools\Components | | |
| copyComs.bat.txt | 309 | Feb. 14, 2005 |
| Form1.frm.txt | 1,014 | Feb. 14, 2005 |
| Form2.frm.txt | 1,087 | Feb. 14, 2005 |
| Form5.frm.txt | 1,309 | Feb. 14, 2005 |
| UW_Patent_Source\UnityTools\Components\Business | | |
| BroadcastList.cls.txt | 5,956 | Feb. 14, 2005 |
| BroadcastLists.cls.txt | 2,959 | Feb. 14, 2005 |
| CCampaign.cls.txt | 385 | Feb. 14, 2005 |
| CContent.cls.txt | 16,500 | Feb. 14, 2005 |
| CContentList.cls.txt | 11,208 | Feb. 14, 2005 |
| CContentPool.cls.txt | 25,736 | Feb. 14, 2005 |
| CCRA.cls.txt | 14,913 | Feb. 14, 2005 |
| CFlyer.cls.txt | 20,072 | Feb. 14, 2005 |
| CFRA.cls.txt | 21,617 | Feb. 14, 2005 |
| CFtp.cls.txt | 12,024 | Feb. 14, 2005 |
| CMRA.cls.txt | 26,573 | Feb. 14, 2005 |
| CNotes.cls.txt | 3,605 | Feb. 14, 2005 |
| Contact.cls.txt | 10,416 | Feb. 14, 2005 |
| Context.bas.txt | 5,381 | Feb. 14, 2005 |
| CSession.cls.txt | 3,534 | Feb. 14, 2005 |
| CSlideSet.cls.txt | 42,097 | Feb. 14, 2005 |
| CSlideSetList.cls.txt | 12,488 | Feb. 14, 2005 |
| CVisitor.cls.txt | 6,068 | Feb. 14, 2005 |
| DB.bas.txt | 7,715 | Feb. 14, 2005 |
| Encryption.bas.txt | 2,593 | Feb. 14, 2005 |
| ErrorCodes.bas.txt | 23,167 | Feb. 14, 2005 |
| Event.cls.txt | 26,955 | Feb. 14, 2005 |
| Events.cls.txt | 4,803 | Feb. 14, 2005 |
| FileSystem.bas.txt | 1,851 | Feb. 14, 2005 |
| Form1.frm.txt | 1,361 | Feb. 14, 2005 |
| Format.bas.txt | 19,884 | Feb. 14, 2005 |
| Ftp.bas.txt | 78 | Feb. 14, 2005 |
| HTMLFunctions.bas.txt | 43,153 | Feb. 14, 2005 |
| IContent.cls.txt | 1,386 | Feb. 14, 2005 |

-continued

| TITLE | SIZE IN BYTES | CREATION DATE |
|---|---|---|
| Link.cls.txt | 6,181 | Feb. 14, 2005 |
| Links.cls.txt | 4,127 | Feb. 14, 2005 |
| Location.cls.txt | 15,029 | Feb. 14, 2005 |
| Locations.cls.txt | 3,547 | Feb. 14, 2005 |
| Mapping.bas.txt | 5,968 | Feb. 14, 2005 |
| Member.cls.txt | 26,609 | Feb. 14, 2005 |
| Members.cls.txt | 4,105 | Feb. 14, 2005 |
| Membership.cls.txt | 24,688 | Feb. 14, 2005 |
| Memberships.cls.txt | 5,051 | Feb. 14, 2005 |
| Message.cls.txt | 26,600 | Feb. 14, 2005 |
| Messages.cls.txt | 4,416 | Feb. 14, 2005 |
| Page.cls.txt | 9,022 | Feb. 14, 2005 |
| Pages.cls.txt | 3,974 | Feb. 14, 2005 |
| PublishQueue.cls.txt | 6,476 | Feb. 14, 2005 |
| Reminder.cls.txt | 8,977 | Feb. 14, 2005 |
| Reminders.cls.txt | 4,692 | Feb. 14, 2005 |
| SessionState.cls.txt | 869 | Feb. 14, 2005 |
| Team.cls.txt | 50,094 | Feb. 14, 2005 |
| Teams.cls.txt | 4,036 | Feb. 14, 2005 |
| TestVideoAutoRender.frm.txt | 1,597 | Feb. 14, 2005 |
| TestVideoAutoRender2.frm.txt | 1,597 | Feb. 14, 2005 |
| Validation.bas.txt | 5,001 | Feb. 14, 2005 |
| UW_Patent_Source\UnityTools\Components\CSFtpSolution\WindowsControlLibrary1 | | |
| UserControl1.cs.txt | 1,209 | Feb. 14, 2005 |
| UW_Patent_Source\UnityTools\Components\DB | | |
| CCache.cls.txt | 6,837 | Feb. 14, 2005 |
| CDB_XML.cls.txt | 25,803 | Feb. 14, 2005 |
| CDBIO.cls.txt | 66,243 | Feb. 14, 2005 |
| Context.bas.txt | 5,381 | Feb. 14, 2005 |
| DB.bas.txt | 7,715 | Feb. 14, 2005 |
| Format.bas.txt | 19,884 | Feb. 14, 2005 |
| UW_Patent_Source\UnityTools\Components\FlyerBoxSink | | |
| CEmail.cls.txt | 11,106 | Feb. 14, 2005 |
| EventSink.cls.txt | 18,796 | Feb. 14, 2005 |
| Form1.frm.txt | 705 | Feb. 14, 2005 |
| UW_Patent_Source\UnityTools\Components\FtpLib | | |
| FTPFactory.cs.txt | 12,508 | Feb. 14, 2005 |
| test.cs.txt | 617 | Feb. 14, 2005 |
| UW_Patent_Source\UnityTools\Components\ImageLib | | |
| CImage.cs.txt | 10,444 | Feb. 14, 2005 |
| UW_Patent_Source\UnityTools\Components\ImageLibShell | | |
| _UpgradeReport.htm.txt | 7,215 | Feb. 14, 2005 |
| AssemblyInfo.vb.txt | 928 | Feb. 14, 2005 |
| ImageLibShell.vb.txt | 39,435 | Feb. 14, 2005 |
| UW_Patent_Source\UnityTools\Components\SgmlReader\CommandLine | | |
| Html.dtd.txt | 69,259 | Feb. 14, 2005 |
| Main.cs.txt | 10,287 | Feb. 14, 2005 |
| UW_Patent_Source\UnityTools\Components\SgmlReader\SgmlReaderDll | | |
| SgmlParser.cs.txt | 31,332 | Feb. 14, 2005 |
| SgmlReader.cs.txt | 29,922 | Feb. 14, 2005 |
| UW_Patent_Source\UnityTools\Components\SlideViewerTest | | |
| Form1.frm.txt | 2,529 | Feb. 14, 2005 |
| UW_Patent_Source\UnityTools\Components\SqlDmo\4581 | | |
| dmoMain.bas.txt | 118 | Feb. 14, 2005 |
| DMOMAIN.FRM.txt | 19,380 | Feb. 14, 2005 |
| Dmosproc.frm.txt | 3,240 | Feb. 14, 2005 |
| DMOTABLE.FRM.txt | 2,617 | Feb. 14, 2005 |
| UW_Patent_Source\UnityTools\Components\SqlDmo\SQLDMO | | |
| Form1.cs.txt | 12,080 | Feb. 14, 2005 |
| UW_Patent_Source\UnityTools\Components\Strings | | |
| CErrorMessages.cls.txt | 2,598 | Feb. 14, 2005 |
| Context.bas.txt | 5,381 | Feb. 14, 2005 |

-continued

| TITLE | SIZE IN BYTES | CREATION DATE |
|---|---|---|
| ErrorCodes.bas.txt | 23,167 | Feb. 14, 2005 |
| Strings_English.bas.txt | 17,330 | Feb. 14, 2005 |
| UW_Patent_Source\UnityTools\Components\TestAutoRender | | |
| TestVideoAutoRender.frm.txt | 1,597 | Feb. 14, 2005 |
| UW_Patent_Source\UnityTools\Components\TestValidation | | |
| testForm.frm.txt | 855 | Feb. 14, 2005 |
| UW_Patent_Source\UnityTools\Components\Utils | | |
| CBase29.cls.txt | 1,495 | Feb. 14, 2005 |
| CBase34.cls.txt | 1,129 | Feb. 14, 2005 |
| CBase36.cls.txt | 1,129 | Feb. 14, 2005 |
| CBase62.cls.txt | 1,154 | Feb. 14, 2005 |
| CCollection.cls.txt | 2,047 | Feb. 14, 2005 |
| CEncrypt.cls.txt | 9,197 | Feb. 14, 2005 |
| CErrorMessages.cls.txt | 2,598 | Feb. 14, 2005 |
| Context.bas.txt | 5,381 | Feb. 14, 2005 |
| CRegistryTool.cls.txt | 10,737 | Feb. 14, 2005 |
| CStringBuilder.cls.txt | 12,773 | Feb. 14, 2005 |
| CTimer.cls.txt | 1,604 | Feb. 14, 2005 |
| ErrorCodes.bas.txt | 22,910 | Feb. 14, 2005 |
| SymmCrypto.cls.txt | 973 | Feb. 14, 2005 |
| TimeValidater.cls.txt | 745 | Feb. 14, 2005 |
| UW_Patent_Source\UnityTools\Components\UTOrderBeans | | |
| cAddress.cls.txt | 3,587 | Feb. 14, 2005 |
| cAddresses.cls.txt | 891 | Feb. 14, 2005 |
| Cart.cls.txt | 718 | Feb. 14, 2005 |
| Catalog.cls.txt | 1,697 | Feb. 14, 2005 |
| cBilling.cls.txt | 432 | Feb. 14, 2005 |
| cCatalog.cls.txt | 5,564 | Feb. 14, 2005 |
| cCatalogs.cls.txt | 2,118 | Feb. 14, 2005 |
| cCheckOut.cls.txt | 7,487 | Feb. 14, 2005 |
| cCreditCard.cls.txt | 9,529 | Feb. 14, 2005 |
| cCustomer.cls.txt | 10,672 | Feb. 14, 2005 |
| CItem.cls.txt | 900 | Feb. 14, 2005 |
| CItems.cls.txt | 1,284 | Feb. 14, 2005 |
| Context.bas.txt | 4,028 | Feb. 14, 2005 |
| COrder.cls.txt | 1,512 | Feb. 14, 2005 |
| COrders.cls.txt | 955 | Feb. 14, 2005 |
| CPurchaseItem.cls.txt | 1,036 | Feb. 14, 2005 |
| CPurchaseItems.cls.txt | 1,076 | Feb. 14, 2005 |
| CreditCard.cls.txt | 4,385 | Feb. 14, 2005 |
| CService.cls.txt | 930 | Feb. 14, 2005 |
| CServices.cls.txt | 1,045 | Feb. 14, 2005 |
| CShoppingCart.cls.txt | 8,819 | Feb. 14, 2005 |
| CSKU.cls.txt | 5,433 | Feb. 14, 2005 |
| CSkus.cls.txt | 1,040 | Feb. 14, 2005 |
| ECommerce.cls.txt | 2,031 | Feb. 14, 2005 |
| modEnums.bas.txt | 747 | Feb. 14, 2005 |
| Order.cls.txt | 731 | Feb. 14, 2005 |
| OrderDB.bas.txt | 3,678 | Feb. 14, 2005 |
| UW_Patent_Source\UnityTools\Components\UWMDemo | | |
| index.asp.txt | 919 | Feb. 14, 2005 |
| Password.cls.txt | 3,078 | Feb. 14, 2005 |
| UW_Patent_Source\UnityTools\Components\Validation | | |
| SymmCrypto.cls.txt | 733 | Feb. 14, 2005 |
| testForm.frm.txt | 2,946 | Feb. 14, 2005 |
| TimeValidater.cls.txt | 744 | Feb. 14, 2005 |
| UW_Patent_Source\UnityTools\Components\Web | | |
| 2002_03_11 CSlideViewer.cls.txt | 72,286 | Feb. 14, 2005 |
| Broadcast.cls.txt | 41,392 | Feb. 14, 2005 |
| BroadcastListDetail.cls.txt | 22,286 | Feb. 14, 2005 |
| CallStack.bas.txt | 2,425 | Feb. 14, 2005 |
| CallState.bas.txt | 54 | Feb. 14, 2005 |
| CareCast.cls.txt | 6,689 | Feb. 14, 2005 |
| CCallState.cls.txt | 27,869 | Feb. 14, 2005 |
| CCampaign.cls.txt | 4,500 | Feb. 14, 2005 |
| CCustomerService.cls.txt | 9,278 | Feb. 14, 2005 |
| CFlyer.cls.txt | 4,460 | Feb. 14, 2005 |
| CFlyerView.cls.txt | 37,916 | Feb. 14, 2005 |
| CFtp.cls.txt | 12,024 | Feb. 14, 2005 |
| CImage.cls.txt | 7,078 | Feb. 14, 2005 |

-continued

| TITLE | SIZE IN BYTES | CREATION DATE |
|---|---|---|
| CLibraryTool.cls.txt | 11,430 | Feb. 14, 2005 |
| CLinkLookup.cls.txt | 5,037 | Feb. 14, 2005 |
| CListView.cls.txt | 97,742 | Feb. 14, 2005 |
| CListViewL.cls.txt | 61,608 | Feb. 14, 2005 |
| CMRAForm.cls.txt | 35,109 | Feb. 14, 2005 |
| CNotes.cls.txt | 2,948 | Feb. 14, 2005 |
| Configuration.cls.txt | 34,962 | Feb. 14, 2005 |
| ContentSubmission.cls.txt | 12,050 | Feb. 14, 2005 |
| Context.bas.txt | 5,381 | Feb. 14, 2005 |
| CPoolManager.cls.txt | 33,418 | Feb. 14, 2005 |
| CSlideViewer.cls.txt | 206,709 | Feb. 14, 2005 |
| CSlideViewerL.cls.txt | 82,504 | Feb. 14, 2005 |
| CVideoViewer.cls.txt | 157,686 | Feb. 14, 2005 |
| CView.cls.txt | 42,596 | Feb. 14, 2005 |
| CViewContainer.cls.txt | 17,354 | Feb. 14, 2005 |
| CViews.cls.txt | 1,579 | Feb. 14, 2005 |
| EditorTool.cls.txt | 51,257 | Feb. 14, 2005 |
| Email.bas.txt | 35,030 | Feb. 14, 2005 |
| Encryption.bas.txt | 2,593 | Feb. 14, 2005 |
| ErrorCodes.bas.txt | 23,167 | Feb. 14, 2005 |
| EventCalendar.cls.txt | 24,899 | Feb. 14, 2005 |
| EventDetail.cls.txt | 30,063 | Feb. 14, 2005 |
| FileSystem.bas.txt | 1,851 | Feb. 14, 2005 |
| Folder.cls.txt | 29,819 | Feb. 14, 2005 |
| Format.bas.txt | 19,884 | Feb. 14, 2005 |
| Ftp.bas.txt | 78 | Feb. 14, 2005 |
| HTMLFunctions.bas.txt | 61,786 | Feb. 14, 2005 |
| InvitationTool.cls.txt | 11,005 | Feb. 14, 2005 |
| IWebComponent.cls.txt | 1,109 | Feb. 14, 2005 |
| KO_Ministry.cls.txt | 4,203 | Feb. 14, 2005 |
| KO_Portfolio.cls.txt | 6,981 | Feb. 14, 2005 |
| LocationDetail.cls.txt | 374 | Feb. 14, 2005 |
| MasterView.cls.txt | 21,320 | Feb. 14, 2005 |
| MembershipDetail.cls.txt | 48,782 | Feb. 14, 2005 |
| MessageBoard.cls.txt | 50,794 | Feb. 14, 2005 |
| MessageDetail.cls.txt | 89,740 | Feb. 14, 2005 |
| Notification.cls.txt | 370 | Feb. 14, 2005 |
| Page.cls.txt | 21,395 | Feb. 14, 2005 |
| PasswordRecovery.cls.txt | 10,661 | Feb. 14, 2005 |
| Publish.cls.txt | 26,239 | Feb. 14, 2005 |
| Publisher.cls.txt | 7,734 | Feb. 14, 2005 |
| Roster.cls.txt | 19,397 | Feb. 14, 2005 |
| Rotator.cls.txt | 3,470 | Feb. 14, 2005 |
| Search.cls.txt | 11,549 | Feb. 14, 2005 |
| Security.cls.txt | 8,404 | Feb. 14, 2005 |
| SubmissionDetail.cls.txt | 5,737 | Feb. 14, 2005 |
| TeamDetail.cls.txt | 27,927 | Feb. 14, 2005 |
| TeamHeader.cls.txt | 16,387 | Feb. 14, 2005 |
| TemplateSelector.cls.txt | 10,856 | Feb. 14, 2005 |
| UnityConstants.bas.txt | 423 | Feb. 14, 2005 |
| UnityWorksTemplate.bas.txt | 481 | Feb. 14, 2005 |
| UserHTML.cls.txt | 8,838 | Feb. 14, 2005 |
| VerticalNav.cls.txt | 17,794 | Feb. 14, 2005 |
| Video.cls.txt | 6,986 | Feb. 14, 2005 |
| VideoViewer.cls.txt | 53,841 | Feb. 14, 2005 |
| WebComponents.cls.txt | 3,401 | Feb. 14, 2005 |
| WebModuleWrapper.cls.txt | 15,215 | Feb. 14, 2005 |
| UW_Patent_Source\UnityTools\Components\XML | | |
| member.xslt.txt | 2,413 | Feb. 14, 2005 |
| MemberSample.xml.txt | 2,657 | Feb. 14, 2005 |
| SampleMember.spp.txt | 665 | Feb. 14, 2005 |
| SampleMember.xslt.txt | 2,607 | Feb. 14, 2005 |
| UW_Patent_Source\UnityTools\OutlookLibrary | | |
| basCommandBars.bas.txt | 2,358 | Feb. 14, 2005 |
| basDebug.bas.txt | 603 | Feb. 14, 2005 |
| basMenus.bas.txt | 4,637 | Feb. 14, 2005 |
| basOutlook.bas.txt | 2,608 | Feb. 14, 2005 |
| basRegistry.bas.txt | 7,256 | Feb. 14, 2005 |
| ChooseViewer.frm.txt | 1,260 | Feb. 14, 2005 |
| Connect.Dsr.txt | 3,053 | Feb. 14, 2005 |
| dlgOptions.frm.txt | 2,345 | Feb. 14, 2005 |

-continued

| TITLE | SIZE IN BYTES | CREATION DATE |
|---|---:|---|
| OutAddIn.cls.txt | 5,655 | Feb. 14, 2005 |
| URLPictureBox.ctl.txt | 1,531 | Feb. 14, 2005 |
| URLPictureBox.ctx.txt | 6,352 | Feb. 14, 2005 |
| UW_Patent_Source\UnityTools\Reports | | |
| CustomerReports.adp.txt | 47,412 | Feb. 14, 2005 |
| GetAllLogData.htm.txt | 41,024 | Feb. 14, 2005 |
| GetVideoFileSummary1.htm.txt | 31,433 | Feb. 14, 2005 |
| GetVideoFileSummary2.htm.txt | 23,060 | Feb. 14, 2005 |
| ko_10_27-31.doc.txt | 482,959 | Feb. 14, 2005 |
| ko_11_26-30.doc.txt | 153,471 | Feb. 14, 2005 |
| Report1.rpt.txt | 510,822 | Feb. 14, 2005 |
| Report2.rpt.txt | 1,759,265 | Feb. 14, 2005 |
| Report3.rpt.txt | 189,729 | Feb. 14, 2005 |
| speedlog.doc.txt | 338,437 | Feb. 14, 2005 |
| TeamVideoDay.rpt.txt | 33,592 | Feb. 14, 2005 |
| TeamVideoDay2.rpt.txt | 73,345 | Feb. 14, 2005 |
| UW_Patent_Source\UnityTools\Reports\GetAllLogData_files | | |
| file0007.css.txt | 35,557 | Feb. 14, 2005 |
| file0008.css.txt | 1,133 | Feb. 14, 2005 |
| file0012.css.txt | 1,610 | Feb. 14, 2005 |
| filelist.xml.txt | 511 | Feb. 14, 2005 |
| UW_Patent_Source\UnityTools\Reports\GetVideoFileSummary2_files | | |
| file0007.css.txt | 35,557 | Feb. 14, 2005 |
| file0008.css.txt | 1,133 | Feb. 14, 2005 |
| file0012.css.txt | 1,610 | Feb. 14, 2005 |
| filelist.xml.txt | 518 | Feb. 14, 2005 |
| UW_Patent_Source\Uploader | | |
| TextFile1.txt.txt | 624 | Feb. 14, 2005 |
| Uploader.vsd.txt | 95,169 | Feb. 14, 2005 |
| Uploader2.vsd.txt | 641,844 | Feb. 14, 2005 |
| Uploader3.vsd.txt | 648,978 | Feb. 14, 2005 |
| Uploader4.vsd.txt | 827,491 | Feb. 14, 2005 |
| XMLFile1.xml.txt | 42,899 | Feb. 14, 2005 |
| XMLFile1.xsd.txt | 4,339 | Feb. 14, 2005 |
| XMLFile1.xsx.txt | 196 | Feb. 14, 2005 |
| XMLFile11.xsd.txt | 4,019 | Feb. 14, 2005 |
| XMLFile11.xsx.txt | 196 | Feb. 14, 2005 |
| XMLFile2.xml.txt | 42,439 | Feb. 14, 2005 |
| XSLTFile1.xsl.txt | 1,265 | Feb. 14, 2005 |
| XSLTFile1.xslt.txt | 216 | Feb. 14, 2005 |
| UW_Patent_Source\Uploader\AppStart | | |
| App.config.txt | 584 | Feb. 14, 2005 |
| AppStart.cs.txt | 4,643 | Feb. 14, 2005 |
| ConfigSectionHandler.cs.txt | 3,381 | Feb. 14, 2005 |
| UW_Patent_Source\Uploader\BatchProcessor | | |
| MainForm.cs.txt | 4,375 | Feb. 14, 2005 |
| QueueProcessor.cs.txt | 517 | Feb. 14, 2005 |
| UW_Patent_Source\Uploader\dotNet | | |
| AuthHeader.cs.txt | 1,028 | Feb. 14, 2005 |
| Bandwidth.asmx.cs.txt | 1,632 | Feb. 14, 2005 |
| Bandwidth.asmx.txt | 92 | Feb. 14, 2005 |
| DataHelper.cs.txt | 867 | Feb. 14, 2005 |
| db.cs.txt | 2,916 | Feb. 14, 2005 |
| Security.asmx.cs.txt | 3,526 | Feb. 14, 2005 |
| Security.asmx.txt | 90 | Feb. 14, 2005 |
| Send2Friend.aspx.cs.txt | 4,859 | Feb. 14, 2005 |
| Send2Friend.aspx.txt | 4,576 | Feb. 14, 2005 |
| SoapHelper.cs.txt | 2,508 | Feb. 14, 2005 |
| Thanks.aspx.txt | 1,037 | Feb. 14, 2005 |
| VideoProcessing.asmx.cs.txt | 19,497 | Feb. 14, 2005 |
| VideoProcessing.asmx.txt | 104 | Feb. 14, 2005 |
| UW_Patent_Source\Uploader\EncoderTest | | |
| app.config.txt | 5,660 | Feb. 14, 2005 |
| Form1.cs.txt | 5,898 | Feb. 14, 2005 |
| VideoEditorConfig.cs.txt | 2,978 | Feb. 14, 2005 |
| UW_Patent_Source\Uploader\EncoderTest\Queue | | |
| UWVP_Queue.xml.txt | 4,483 | Feb. 14, 2005 |

-continued

| TITLE | SIZE IN BYTES | CREATION DATE |
|---|---|---|
| UW_Patent_Source\Uploader\HtmlEditorLight | | |
| HtmlControl.cs.txt | 44,872 | Feb. 14, 2005 |
| TestForm.cs.txt | 10,006 | Feb. 14, 2005 |
| UW_Patent_Source\Uploader\HtmlEditorLight\Dialogs | | |
| HyperlinkWizard.cs.txt | 13,170 | Feb. 14, 2005 |
| SearchReplace.cs.txt | 6,491 | Feb. 14, 2005 |
| UW_Patent_Source\Uploader\ManifestUtility | | |
| KeyGenerator.cs.txt | 1,570 | Feb. 14, 2005 |
| ManifestSettings.cs.txt | 10,056 | Feb. 14, 2005 |
| ManifestUtilityMainForm.cs.txt | 33,295 | Feb. 14, 2005 |
| UW_Patent_Source\Uploader\UW_VideoProcessingClient | | |
| AboutApplication.cs.txt | 9,965 | Feb. 14, 2005 |
| app.config.txt | 2,868 | Feb. 14, 2005 |
| app_save.config.txt | 5,086 | Feb. 14, 2005 |
| AuthHeader.cs.txt | 1,102 | Feb. 14, 2005 |
| Bandwidth.cs.txt | 4,981 | Feb. 14, 2005 |
| CImage.cs.txt | 18,664 | Feb. 14, 2005 |
| CodeFile1.cs.txt | 2 | Feb. 14, 2005 |
| Copy of VideoEditor.cs.txt | 55,346 | Feb. 14, 2005 |
| EditTag.cs.txt | 4,589 | Feb. 14, 2005 |
| EncodingSchema.xml.txt | 2,194 | Feb. 14, 2005 |
| EncodingSchemas.xml.txt | 2,894 | Feb. 14, 2005 |
| FlashEncoder.cs.txt | 2,100 | Feb. 14, 2005 |
| FlyerEditor.cs.txt | 35,924 | Feb. 14, 2005 |
| frmMain.cs.txt | 32,565 | Feb. 14, 2005 |
| HtmlControl.cs.txt | 44,872 | Feb. 14, 2005 |
| Login.cs.txt | 10,167 | Feb. 14, 2005 |
| MediaPlayerEncoder.cs.txt | 5,144 | Feb. 14, 2005 |
| Member.cs.txt | 12,192 | Feb. 14, 2005 |
| MembershipToTeams.xsl.txt | 1,094 | Feb. 14, 2005 |
| NetrixReadme.txt.txt | 1,294 | Feb. 14, 2005 |
| NetrixSerialNumber.txt.txt | 79 Feb. 14, 2005 | Feb. 14, 2005 |
| PostProcessor.cs.txt | 8,797 | Feb. 14, 2005 |
| SearchReplace.cs.txt | 5,870 | Feb. 14, 2005 |
| serialNumber.txt.txt | 79 | Feb. 14, 2005 |
| Splash.cs.txt | 6,562 | Feb. 14, 2005 |
| StringFunctions.cs.txt | 2,065 | Feb. 14, 2005 |
| TeamSelectorForm.cs.txt | 8,297 | Feb. 14, 2005 |
| Updater.cs.txt | 23,772 | Feb. 14, 2005 |
| Uploader.cs.txt | 10,998 | Feb. 14, 2005 |
| Uploading.cs.txt | 3,023 | Feb. 14, 2005 |
| UW_VideoProcessingClient.xml.txt | 68,819 | Feb. 14, 2005 |
| VideoClient.xml.txt | 31,415 | Feb. 14, 2005 |
| VideoEditor.cs.txt | 51,121 | Feb. 14, 2005 |
| VideoEditorConfig.cs.txt | 3,043 | Feb. 14, 2005 |
| VideoEncoder.cs.txt | 5,361 | Feb. 14, 2005 |
| VideoManagement.xml.txt | 45,602 | Feb. 14, 2005 |
| VideoViewer.cs.txt | 2,091 | Feb. 14, 2005 |
| UW_Patent_Source\Uploader\UW_VideoProcessingClient\Dialogs | | |
| HyperlinkWizard.cs.txt | 13,170 | Feb. 14, 2005 |
| SearchReplace.cs.txt | 6,491 | Feb. 14, 2005 |
| UW_Patent_Source\Uploader\UWVP_Installation_Tool\2000_and_XP\UWVP_Installer | | |
| Install.cs.txt | 14,862 | Feb. 14, 2005 |
| InstallerForm.cs.txt | 13,988 | Feb. 14, 2005 |
| Link.cs.txt | 4,521 | Feb. 14, 2005 |
| ReadMe.txt.txt | 98 | Feb. 14, 2005 |
| UW_Patent_Source\Uploader\UWVP_Installation_Tool\XP_Only\UWVP_Installer | | |
| Install.cs.txt | 12,335 | Feb. 14, 2005 |
| InstallerForm.cs.txt | 15,820 | Feb. 14, 2005 |
| Link.cs.txt | 4,523 | Feb. 14, 2005 |
| ReadMe.txt.txt | 98 | Feb. 14, 2005 |
| UW_Patent_Source\Uploader\UWVP_Installation_Tool\XP_Only\UWVP_Installer\Images | | |
| ProgressBar.gif.txt | 2,311 | Feb. 14, 2005 |
| UW_Patent_Source\Uploader\VideoManagement | | |
| app.config.txt | 463 | Feb. 14, 2005 |
| Bandwidth.cs.txt | 5,102 | Feb. 14, 2005 |
| EncodingSchemas.cs.txt | 2,235 | Feb. 14, 2005 |
| Flyer.cs.txt | 2,688 | Feb. 14, 2005 |

-continued

| TITLE | SIZE IN BYTES | CREATION DATE |
|---|---:|---|
| licenses.licx.txt | 153 | Feb. 14, 2005 |
| Login.cs.txt | 10,158 | Feb. 14, 2005 |
| Member.cs.txt | 10,800 | Feb. 14, 2005 |
| Profile.cs.txt | 4,039 | Feb. 14, 2005 |
| Schema.cs.txt | 2,456 | Feb. 14, 2005 |
| SchemaProcessor.cs.txt | 2,694 | Feb. 14, 2005 |
| ServerVideos.cs.txt | 2,640 | Feb. 14, 2005 |
| StringFunctions.cs.txt | 2,047 | Feb. 14, 2005 |
| team.xml.txt | 666 | Feb. 14, 2005 |
| Uploader.cs.txt | 11,599 | Feb. 14, 2005 |
| UploaderEventArgs.cs.txt | 1,786 | Feb. 14, 2005 |
| VideoContainer.cs.txt | 5,692 | Feb. 14, 2005 |
| VideoEncoder.cs.txt | 9,065 | Feb. 14, 2005 |
| VideoEncoderControl.cs.txt | 19,247 | Feb. 14, 2005 |
| VideoEncoderControl_bu.cs.txt | 17,150 | Feb. 14, 2005 |
| VideoItem.cs.txt | 21,672 | Feb. 14, 2005 |
| VideoList.cs.txt | 16,318 | Feb. 14, 2005 |
| VideoListLibrary.cs.txt | 6,627 | Feb. 14, 2005 |
| VideoListTreeView.cs.txt | 5,789 | Feb. 14, 2005 |
| VideoQueue.cs.txt | 9,034 | Feb. 14, 2005 |
| UW_Patent_Source\Uploader\VideoManagement\Web References\svcBandwidth | | |
| Bandwidth.disco.txt | 592 | Feb. 14, 2005 |
| Bandwidth.wsdl.txt | 6,297 | Feb. 14, 2005 |
| Reference.cs.txt | 5,665 | Feb. 14, 2005 |
| Reference.map.txt | 594 | Feb. 14, 2005 |
| UW_Patent_Source\Uploader\VideoManagement\Web References\svcSecurity | | |
| Reference.cs.txt | 7,836 | Feb. 14, 2005 |
| Reference.map.txt | 590 | Feb. 14, 2005 |
| security.disco.txt | 586 | Feb. 14, 2005 |
| security.wsdl.txt | 8,825 | Feb. 14, 2005 |
| UW_Patent_Source\Uploader\VideoManagement\Web References\svcVideoProcessing | | |
| Reference.cs.txt | 14,041 | Feb. 14, 2005 |
| Reference.map.txt | 596 | Feb. 14, 2005 |
| videoprocessing.disco.txt | 616 | Feb. 14, 2005 |
| videoprocessing.wsdl.txt | 8,217 | Feb. 14, 2005 |
| UW_Patent_Source\Uploader\VP_Utility | | |
| Utility.cs.txt | 1,819 | Feb. 14, 2005 |
| Utilityfrm.cs.txt | 3,255 | Feb. 14, 2005 |
| UW_Patent_Source\UWMPresentationsRoot\UWMManagement | | |
| ManagementForm.asp.txt | 673 | Feb. 14, 2005 |
| ManagementForm.aspx.cs.txt | 4,949 | Feb. 14, 2005 |
| ManagementForm.aspx.txt | 2,335 | Feb. 14, 2005 |
| UW_Patent_Source\UWMPresentationsRoot\UWMPresentations | | |
| Password.asmx.cs.txt | 5,324 | Feb. 14, 2005 |
| Password.asmx.txt | 100 | Feb. 14, 2005 |
| UW_Patent_Source\WebServices\LibraryService | | |
| Library.asmx.cs.txt | 2,931 | Feb. 14, 2005 |
| Library.asmx.txt | 110 | Feb. 14, 2005 |
| Library.xslt.txt | 4,784 | Feb. 14, 2005 |
| librarydom.xml.txt | 14,625 | Feb. 14, 2005 |
| UW_Patent_Source\WindowsClients\AppStart.root\AppStart | | |
| App.config.txt | 596 | Feb. 14, 2005 |
| AppStart.cs.txt | 4,643 | Feb. 14, 2005 |
| ConfigSectionHandler.cs.txt | 3,381 | Feb. 14, 2005 |
| UW_Patent_Source\WindowsClients\AppStart.root\UtilityStart | | |
| UtilityStart.cs.txt | 6,068 | Feb. 14, 2005 |
| UW_Patent_Source\WindowsClients\ContentPoolTool | | |
| app.config.txt | 104 | Feb. 14, 2005 |
| db.cs.txt | 2,916 | Feb. 14, 2005 |
| Main.cs.txt | 25,343 | Feb. 14, 2005 |
| UW_Patent_Source\ZipLib | | |
| GZip.cs.txt | 1,556 | Feb. 14, 2005 |
| READ_THIS.txt.txt | 187 | Feb. 14, 2005 |

-continued

| TITLE | SIZE IN BYTES | CREATION DATE |
|---|---|---|
| UW_Patent_Source\ZipLib\gzip | | |
| GZip.cs.txt | 1,657 | Feb. 14, 2005 |
| ZipLib.xml.txt | 969 | Feb. 14, 2005 |
| ziplibSN.bat.txt | 55 | Feb. 14, 2005 |

FIELD OF THE INVENTION

The invention relates generally to computer data processing and more particularly to rich media file management in a computer system.

BACKGROUND OF THE INVENTION

Electronic presentations incorporating various media, for example video, audio, text, and still pictorial components, are known in the art. Such multimedia presentations, often referred to as rich media presentations, have become increasingly popular as computer use has grown and the Internet has expanded. Rich media presentations are now used for advertising, sales and marketing, educational, and general message dissemination purposes locally, over computer networks including the Internet, and via email.

Current rich media presentations and systems for the creation and management of the same, however, suffer from several drawbacks. First, with the variety of media software available to computer users, there is a lack of uniformity in system specifications and capabilities, making the formatting and delivery of the presentations with desired and uniform speed and quality difficult. Second, rich media presentations can be difficult to create, manage, and deliver for those without a fairly sophisticated level of technical expertise and computer knowledge. For example, a business or individual who desires to use rich media for advertising purposes may not have the means necessary to create an original video presentation and manage the formatting, dissemination, and subsequent use of the rich media content. Additionally, rich media presentations can be inflexible, making it difficult to adapt a presentation or customize a message for various uses, audiences, formats, content, and medias.

U.S. patent application Publication No. 2002/0169797, for example, discloses a method and system for generating and providing rich media presentations optimized for a device over a network. An exemplary system in which the invention operates includes wireless mobile devices, a wireless network, a gateway, one or more content delivery networks, a wide area network (WAN)/local area network (LAN), one or more network devices, and one or more World Wide Web origin servers. The system may further include device trackers and detectors that determine the attributes to send optimized rich media presentations to the requesting device. Based on the attributes of the requesting device, the rich media presentations are assembled.

A method and system for delivering technology agnostic rich media content within an email, banner ad, and web page are disclosed in U.S. patent application Publication No. 2002/0129089. According to one aspect of this invention, rich media presentations may be played automatically within an email. When a video email is sent to a recipient, the requesting device receives the necessary rich media presentations, including a virtual player, presentation packages, and media packages, necessary to play the presentation within the email. When the email is opened, the rich media presentation begins to automatically play within the email on supported devices. Rich media presentations may also be played automatically within a web page window.

U.S. patent application Publication No. 2003/0200145 discloses an Internet-based system and method for creating and distributing customized rich media marketing and sales materials via e-mail. Businesses desiring to use the system of the present invention register with the system to obtain user identifications and passwords for its authorized sales personnel, who are typically the primary users of the system. Such businesses also provide their existing sales and marketing materials, such as television, print and streaming rich media electronic presentations and materials, to the system operator for conversion as necessary and storage for use later in creating customized sales and marketing materials for business customers. New materials can also be created specifically for use in customer e-mails created and sent using the system of the present invention. The system stores such materials in a database for selection and use by business sales personnel in creating customized information packages for customers.

Difficulties remain, however, in distributing and sharing rich media presentations among systems and computers that do not have common platforms. Rich media presentations are generally formatted for a particular program or system and problems occur if a recipient does not have the system capabilities or required software with which to view and run the presentation. Further, the management of rich media presentations is complex and technical, particularly when system configurations and specifications are not uniform.

There is, therefore, a need for a rich media system and method of managing the same that substantially address these formatting, management, and delivery shortcomings.

SUMMARY OF THE INVENTION

The invention disclosed herein is a system and method for managing and distributing rich media components and presentations to a plurality of recipient computer systems, regardless of recipient computer system components and configurations.

A method for managing rich media content in a computer system according to one preferred embodiment of the invention comprises assembling rich media content at a first computer system; encoding the rich media content into a plurality of computer readable data formats; uploading the encoded rich media content from the user computer system to a second computer system; storing the uploaded rich media content at the second computer system; indexing the uploaded rich media content in a computer library; creating a flyer by matching and linking uploaded rich media content and an executable icon; and distributing the flyer to at least one recipient computer system in one of the plurality of computer readable data formats determined by the network computer system to be compatible with the at least one recipient computer system.

A method of securing a rich media content library system according to one preferred embodiment of the invention comprises assembling rich media content; encoding the rich media content into a plurality of computer readable data formats; uploading the encoded rich media content to a computer system; indexing the uploaded rich media content in a computer library of the computer system; linking selected rich media content from the library to a web page; encrypting a uniform resource locator associated with the web page; receiving a request for the selected rich media content from a recipient computer system; verifying a system server and name of the page of the request; if the page is verified, returning an encrypted session token and distributing the requested rich media content to the recipient computer system; and if the page is not verified, returning an error message to the recipient computer system.

According to another preferred embodiment of the invention, a system for managing rich media content comprises a first computer system and an uploader application operating on the first computer system; a second computer system communicatively coupled with the first computer system; at least one media library communicatively coupled with the second computer system; a server system communicatively coupled with at least the second computer system; and a management application operating on the second computer system and facilitating communications among the server system, the media library, and the second computer system; wherein the uploader application is operative to format, encode, and upload rich media content from the first computer system to the second computer system, the server system is operative to store the uploaded rich media content from the second computer system, and the library is operative to index the uploaded rich media content.

Rich media content can be organized into one or more schemas in the library. The schemas are preferably predictive of or optimized for particular user system characteristics and configurations and can be technologically, market-segment, or past performance driven. In one embodiment, the one or more schemas can be re-optimized according to changing technology, target characteristics, or other factors. Rich media content can also be stitched together to provide content packages and components having various target stages or zones of special applicability. The stitched content can be made available for upper level approval prior to local-level use and dissemination. In one embodiment, the stitched content is organized into and/or among one or more schemas.

Preferred embodiments of the system and method invention thereby provide a versatile and customizable rich media management system that includes diagnostic and rich media management software tools, enabling businesses and individuals to effectively utilize rich media for a wide variety of purposes without requiring sophisticated training or knowledge of numerous media content development programs. The invention further provides a high level of customization and personalization while maintaining a user-friendly format and interface.

The above summary of the invention is not intended to describe each illustrated embodiment or every implementation of the invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
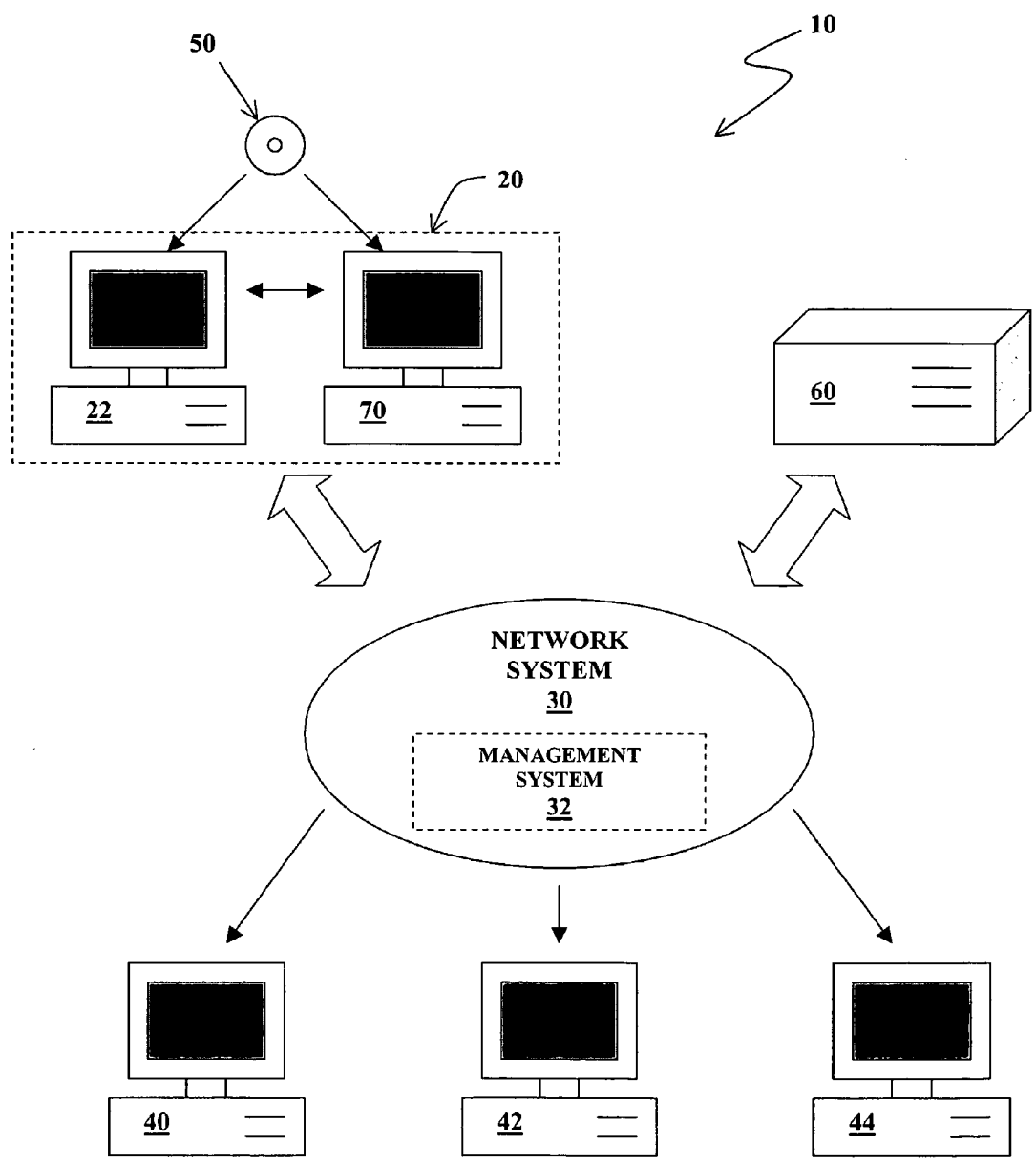
FIG. 1 is a diagram of a computer system according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The managed rich media system of the invention disclosed herein enables rich media content to be integrated into email and on the World Wide Web (the web) and delivered to a plurality of recipients in a distributed environment while enabling versatile management of the system and content. The invention can be more readily understood by reference to FIGS. 1-15, the source code listing on the attached compact disc, and the following description. While the invention is not necessarily limited to such an application, the invention will be better appreciated using a discussion of exemplary embodiments in specific contexts.

FIG. 1 is an exemplary diagram of a computer system 10 in accordance with one embodiment of the invention. The computer system 10 generally comprises a user computer system 20 including rich media system software tools, a network system 30 including rich media and management system applications, a server system 60, and a plurality of recipient computers 40, 42, and 44 in a preferred embodiment.

User computer system 20 can be an individual computer 22 or a multi-computer network, for example an internal corporate computer network, and is generally operable to provide user access to rich media system software tools to facilitate the creation and management of rich media components for assemblage into rich media presentations. The rich media components can include video vignettes, animations, music and audio content, photos, illustrations, text, or other formats which may be incorporated into rich media presentations.

Individual user computer 22 is preferably a laptop or desktop computer that generally includes a standard operating system. In one preferred embodiment, user computer system 20 comprises an uploader application operating installed on user computer 22 and operable to format, encode, and upload rich media content to network system 30 and server system 60 for storage and management. Alternatively, user computer 22 could be a personal digital assistant (PDA) or handheld wireless computing device.

In another preferred embodiment, user computer system 20 further comprises a video and media production system 70 for assembling rich media content. This "creation station" 70 includes audio and visual recording tools to facilitate the production of video vignettes and other multimedia content for uploading or integration with other system content via the uploader application. The uploader software tool can comprise a flyer function that provides a media front end, for example in JPG or HTML format, to video or other rich media content. The flyer function operates in communication with a web-based management system 32 to enable matching and linking of video content with rich media flyers. In one embodiment, the flyer is an executable pictorial or graphical icon within an email message that is linked to particular video content.

Rich media content from an outside source 50, for example a video vignette saved on a CD-ROM, disk, or other computer readable means, can be captured on user computer system 20 via user computer 22 or creation station 70. In another embodiment, video or other media content is originally created at creation station 70. Original content can also be created at user computer 22. User computer system 20 and the rich media system software tools, including an uploader application operating on user computer 22 and creation station 70, then format and encode the rich media components and upload the components to a web-based management system 32 page that is part of a network system 30.

Network system 30 is preferably a web-based network in communication with user computer system 20, server system 60, and a plurality of recipient computers 40, 42, and 44. In one embodiment, user computer system 20 and recipient computers 40, 42, and 44 are each connected to the Internet. User computer system 20 can be a plurality of individual computers 22, with or without creation station 70, that together comprise an internal computer network, for example in an office or other business environment. Network system 30, in communication with server system 60, comprises management system 32 and a library. The library is operable to manage and store the rich media components and presentations and function as a rich media content selection tool for distribution and dissemination.

Figure 2:
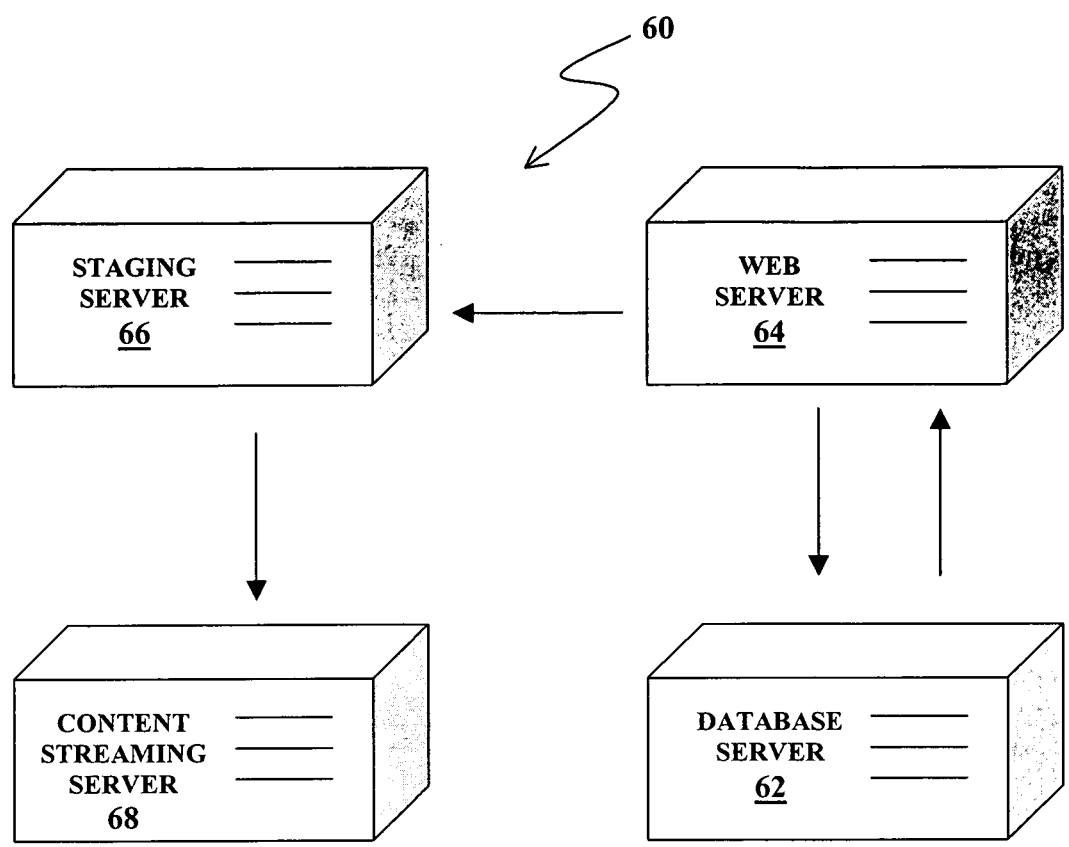
FIG. 2 is a diagram of a server system according to one embodiment of the invention.

Referring to FIG. 2, high availability server system 60 generally comprises at least one database server 62 that stores a video library and a flyer library in one embodiment. Database server 62 communicates with at least one web server 64, which in turn communicates with a staging server 66 and at least one content streaming server 68, to manage encoded and uploaded flyers, videos, and other rich media content. Server system 60 can, for example, manage new and existing content, hold and direct requests for particular content, and replicate content in multiple locations to provide seamless on-demand access to system 10 content.

Figure 3:
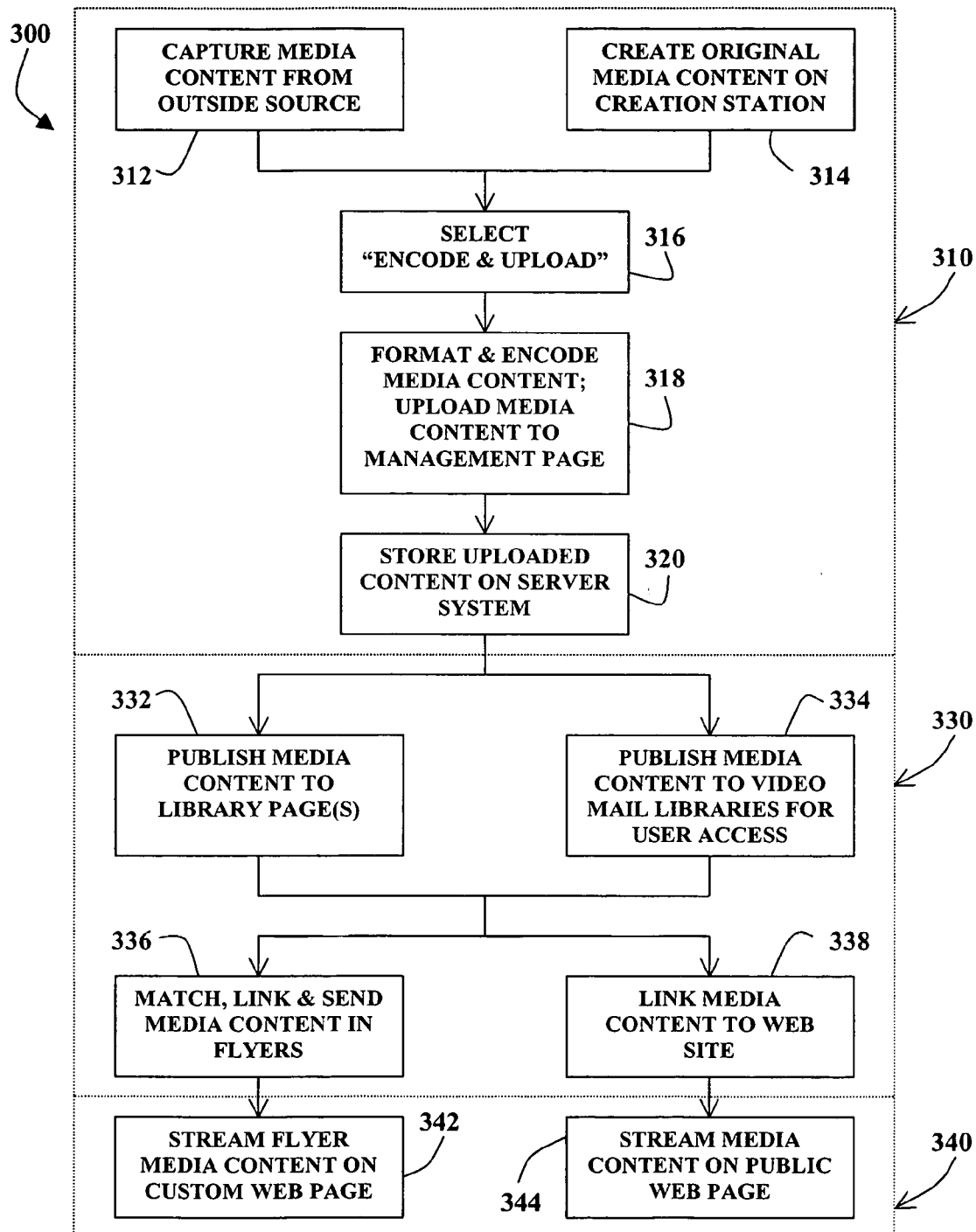
FIG. 3 is a flowchart of one embodiment of a method of the invention.

In operation, and referring to FIGS. 1-3, the creation, management, storage, and delivery of rich media content in one embodiment of the method 300 of the invention takes place in three primary phases. In a first phase 310, rich media content is created and/or captured. As previously described, the media content can be preexisting, captured from an outside source 312, or original media content can be created 314, for example at creation station 70 and/or user computer 22. The desired media content is then selected for encoding and uploading 316 to management system 32.

Figure 4:
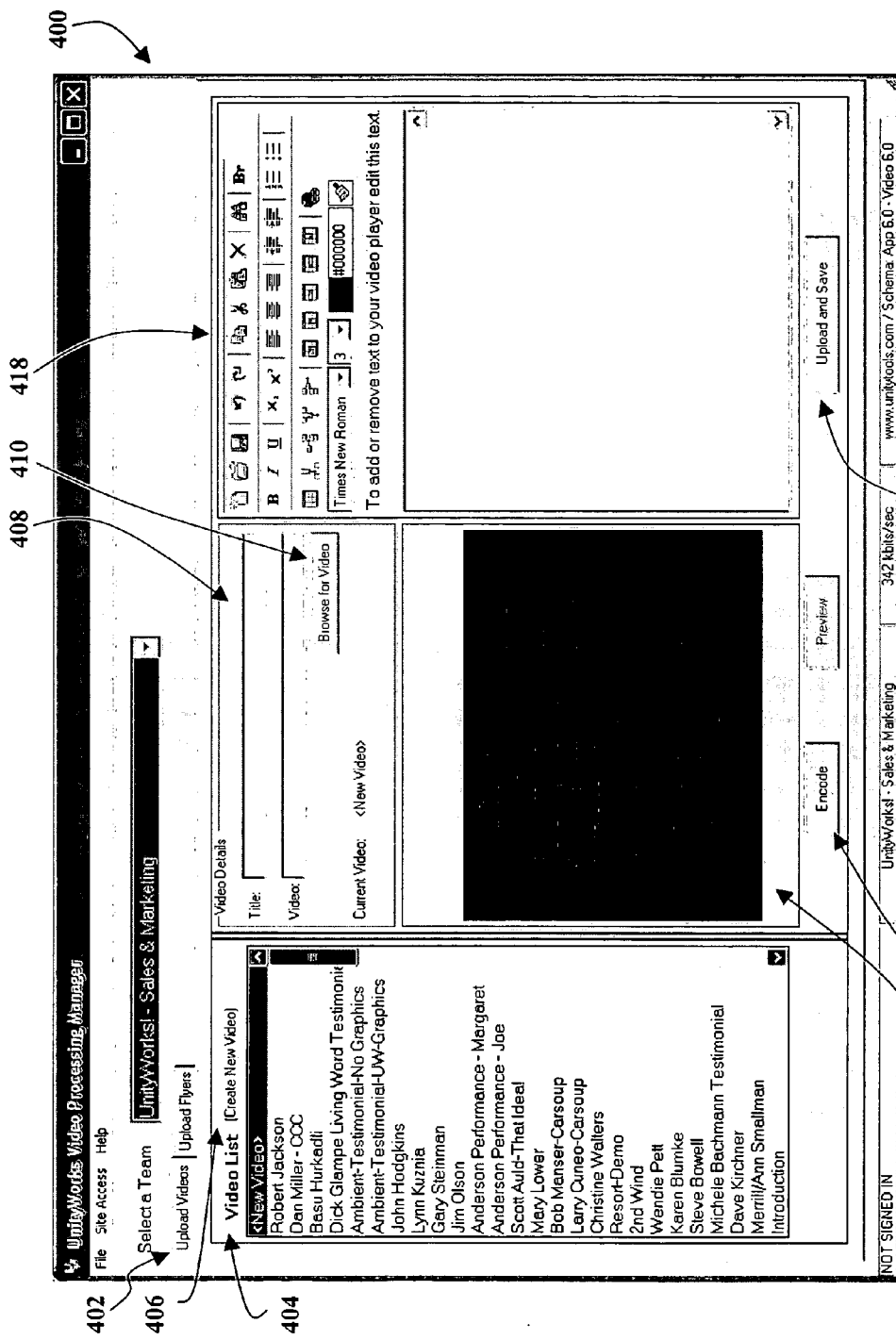
FIG. 4 is an encode and upload processing manager according to one embodiment of the invention.

FIG. 4 is an exemplary encode and upload processing manager 400 according to one embodiment of the invention. Manager 400 includes tabs 402 for organizing rich media content, each tab including a content selection index 404. The embodiment of index 404 shown includes previously captured video content. Videos, flyers, or other rich media content or objects can be selected from an available tab 402 and index 404 for previewing, encoding, and/or uploading. Tab 402 can also include a link 406 to rich media content creation tools, for example system 70 described above, to create a new video or other rich media content. A detail window 408 provides information regarding selected content and also provides an executable browse icon 410 for locating content.

Selected rich media content can be encoded via executable encode icon/button 414. The content is formatted and encoded into at least one format but preferably into a plurality of formats, enabling a variety of end user system configurations, operating systems, web browsers, and media programs to view the content at the end of method 300. Encoded content can then be selectively uploaded to management system 32 at step 318 via executable upload icon/button 416. Prior to uploading, text or other content can be added using tools 418.

The uploader application operating on user computer system 20 enables users to format, encode, and upload custom created JPG, HTML, and other format flyers and videos to web-based management tool 32 at network system 30. During the encoding and uploading process of steps 316 and 318, videos are converted into compatible file formats and encoded at various different bit rates. In one preferred embodiment, videos are converted into WMV format files and/or FLB format files. It will be understood by those skilled in the art that the rich media video content can be converted into other file formats without departing from the spirit and scope of the invention, and that the particular file formats discussed herein throughout are exemplary of only one embodiment of the invention.

The uploader application and web-based management system 32, including encode and upload processing manager 400, are intuitive and user-friendly and do not require that a user possess a high level of technical sophistication in order to successfully capture, select, encode, upload, manage, and deliver rich media content. At step 320, the uploaded content is then stored on high availability server system 60 and indexed in a web-based library that operates in communication with web-based management tool 32 and network system 30. Uploaded content can also be displayed in a preview window 412.

In a second phase 300 of method 300, network system 30 hosts management system 32 and provides a management page through which users can manage rich media content and create rich media messages, including flyers. After the flyers, videos, or other rich media content are uploaded to server system 60 via network 30, users can link the uniquely created content with other available content using web-based management system 32 operating as part of network system 30. Within web-based management system 32, flyer content can be matched, linked, and published in conjunction with related video to private web-based libraries or public or private web pages. Flyers can also be published without other rich media content. Media content can be published to private web-based libraries at step 332 or dedicated video mail libraries at step 334. In one embodiment, generalized web-based libraries are used for publishing all media content, whether for video mail or other purposes.

Figure 5:
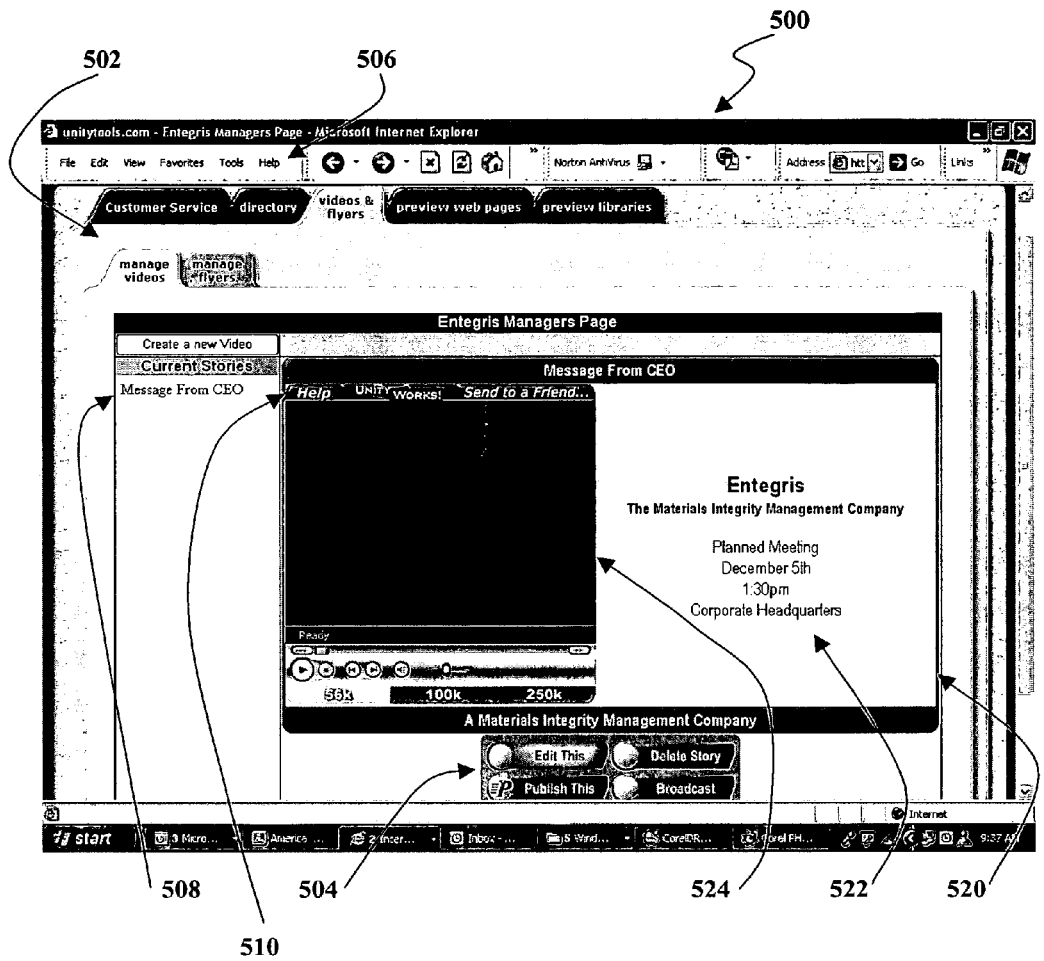
FIG. 5 is a management page according to one embodiment of the invention.

As depicted in the embodiment of FIG. 5, the aforementioned web-based management system 32 comprises a user interface management page 500 with various tabs 502, tools 504, menus 506, indices 508, and options 510 that provide a virtual user workspace for the management and delivery of rich media components. Tabs 502 permit a user to navigate among directories and screens to view, select, and manage message content. Tools 504 enable a user to edit, delete, broadcast, or publish particular content or a complete message. Menus 506 are intuitive to users familiar with typical computer operating systems and include submenus for file system navigation, editing, and system tools, for example. Menus 506 will typically be native to the browser and operating system of user computer system 20. Users can select from, update, and manage current media content and components using indices 508 and can further manage the overall message using options 510.

FIG. 5 further depicts a rich media message 520 created and customized within management page 500. Message 520 includes an information portion 522 that is user customizable and can include text, graphics, and other content. Message 520 also includes a rich media content portion 524 that is also user customizable and in this embodiment comprises a video message. Media content encoded and uploaded via the uploader software tool from user computer system 20 to a private library stored on server system 60 can be accessed by users via web-based management system 32 and user computer system 20. User access to management system 32 can be password protected, enabling only specified users to access system 32 or enabling particular users to access only portions of system 32. From the management page of system 32, users can access content from the library to customize message 520.

Figure 6:
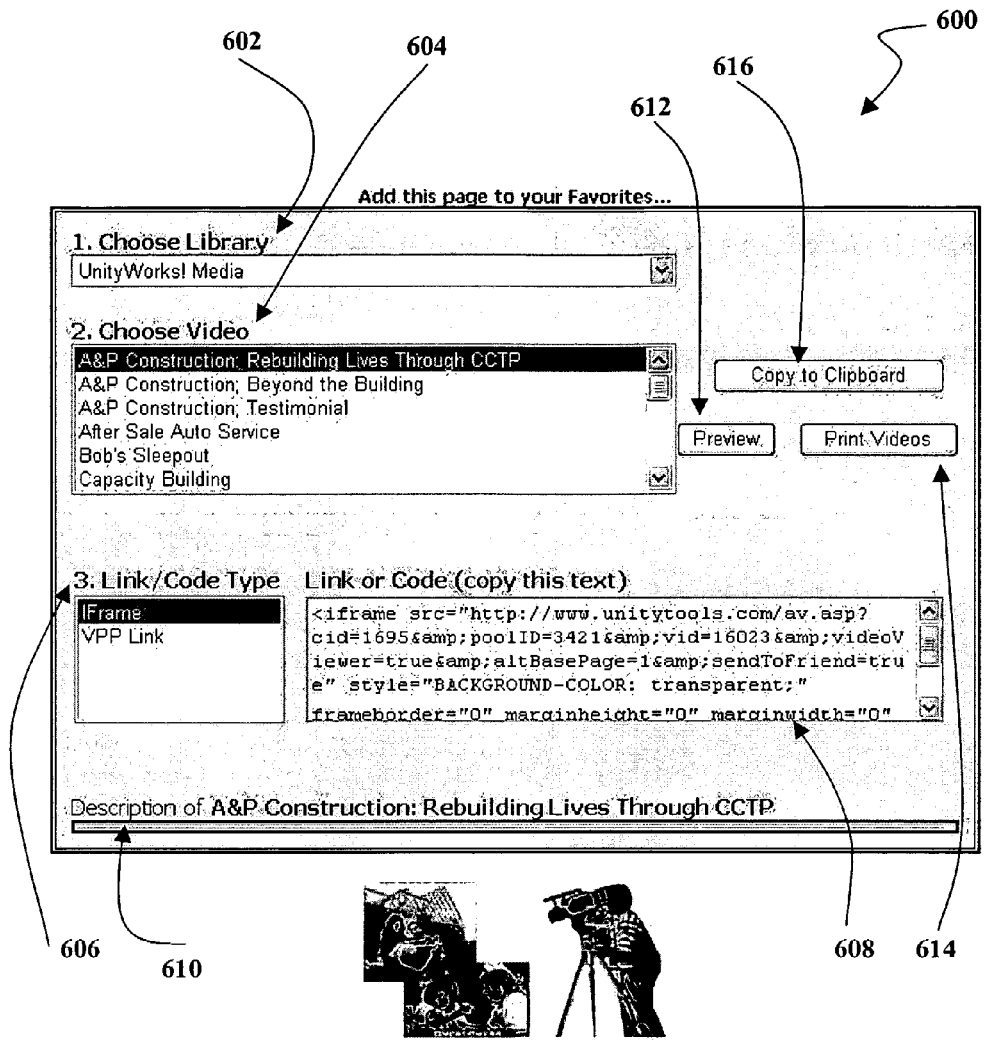
FIG. 6 is a video mail library page according to one embodiment of the invention.

FIG. 6 is an exemplary screen capture of a library management page 600, from which users can select a library 602 and subsequently select a particular rich media video or other message 604 from those available. Library 602 preferably includes a plurality of encoded rich media content from which a user can select an appropriate video or flyer to send to a particular recipient or group of recipients. Description field 610 can be used to more quickly identify desired or relevant content, and users can also preview content directly from page 600 via an executable preview icon/button 612, or print video content via button 614. Selected rich media content can be copied from library 602 for incorporation into a flyer or linking to a web page using button 616. IFRAME and video presentation page (VPP) code, described in more detail below, can be auto-generated and presented on page 600 for selection from frame 606, copying from frame 608, and pasting by a web programmer into an appropriate HTML page. Library page 600 can be subdivided into various pages and can also include a hierarchical folder structure to organize and differentiate content for various uses and/or audiences.

Referring again to FIGS. 3 and 5, after videos and associated flyers are published into the private web-based library at steps 332 and 334, tab 502 displays a video viewer 524 surrounded by selected and customizable context 522. This view enables the user to view the content and appearance of flyer 520 exactly as a recipient will see it after flyer 520 is sent and subsequently received. From library 601, button 608 can be used to copy and embed flyer 520 with associated video in the body of an email message for distribution to a single recipient or a list of recipients from a sender's mail system. Content can be copied from the private library and embedded in flyer 520 with associated video in the body of an email message for distribution to a single recipient or a list of recipients from a sender's mail system.

Figure 7:
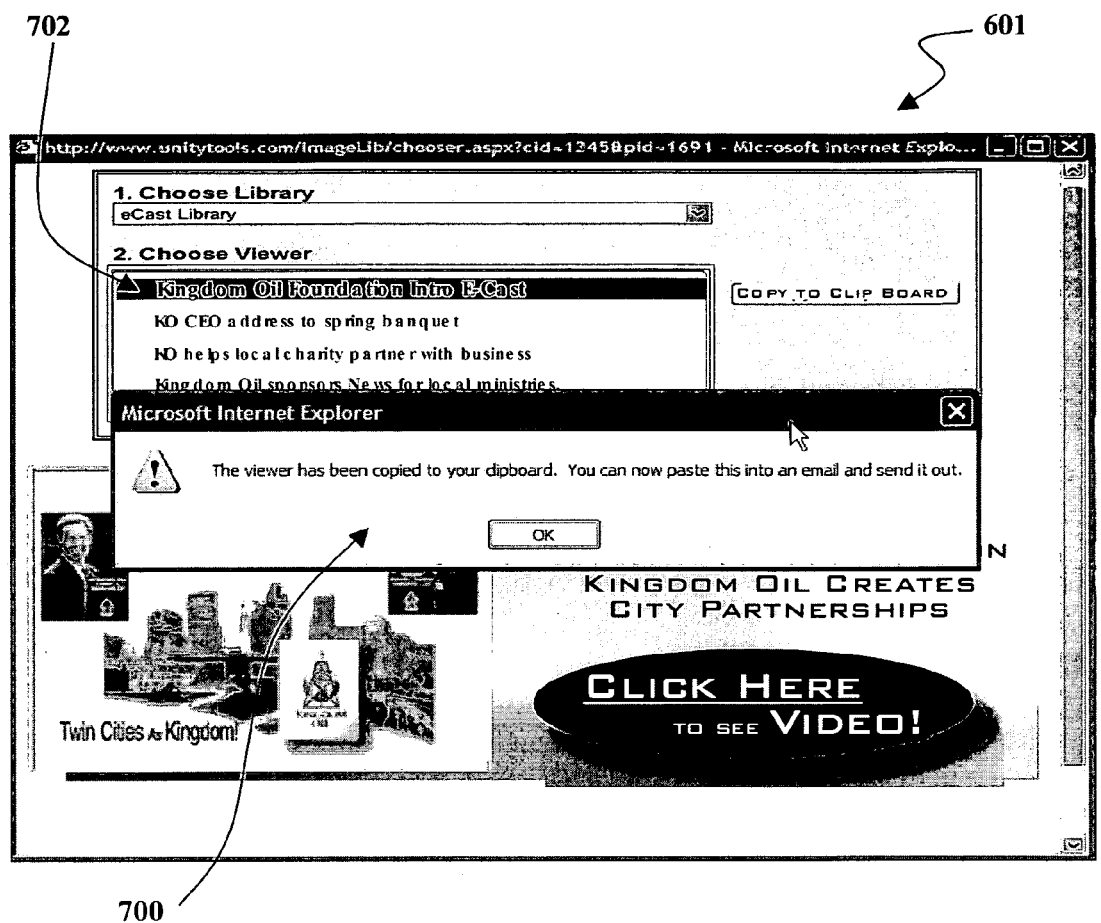
FIG. 7 is a library page according to one embodiment of the invention.
Figure 8:
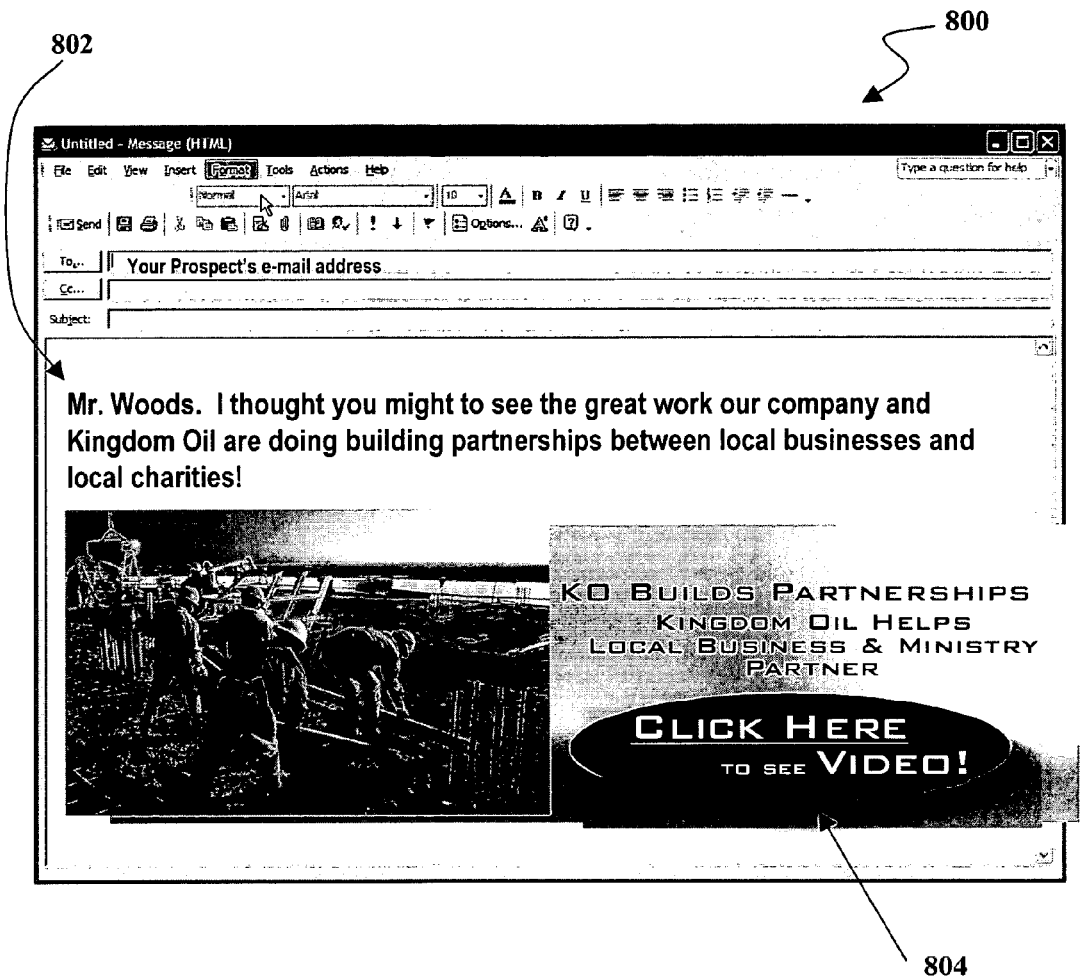
FIG. 8 is a rich media message according to one embodiment of the invention.

For example, FIG. 7 is a screen capture of a library page 601 after particular rich media content 702 has been selected and copied to a clipboard using button 616. As part of the user-friendly interface, an instructional dialog box 700 is provided and instructs the user as to the next step. To send the content as part of a flyer, a user next pastes the content from the clipboard into an email message 800, as shown in FIG. 8. Message 800 can be further customized to include a personal message or other text 802. The content is preferably linked to a selectively executable icon 804. The private library also serves as a digital asset management system in that the private library allows for easy retrieval and searching for specific video content and any associated flyers.

A user can match and link the content to an appropriate flyer and send the flyer as a rich media email, or video mail, message to recipient computer 40 or a plurality of recipient computers 40, 42, and 44 at step 336 of FIG. 3. At step 338, rich media content can be linked via an executable icon to an appropriate page and section of a public web site.

Figure 9:
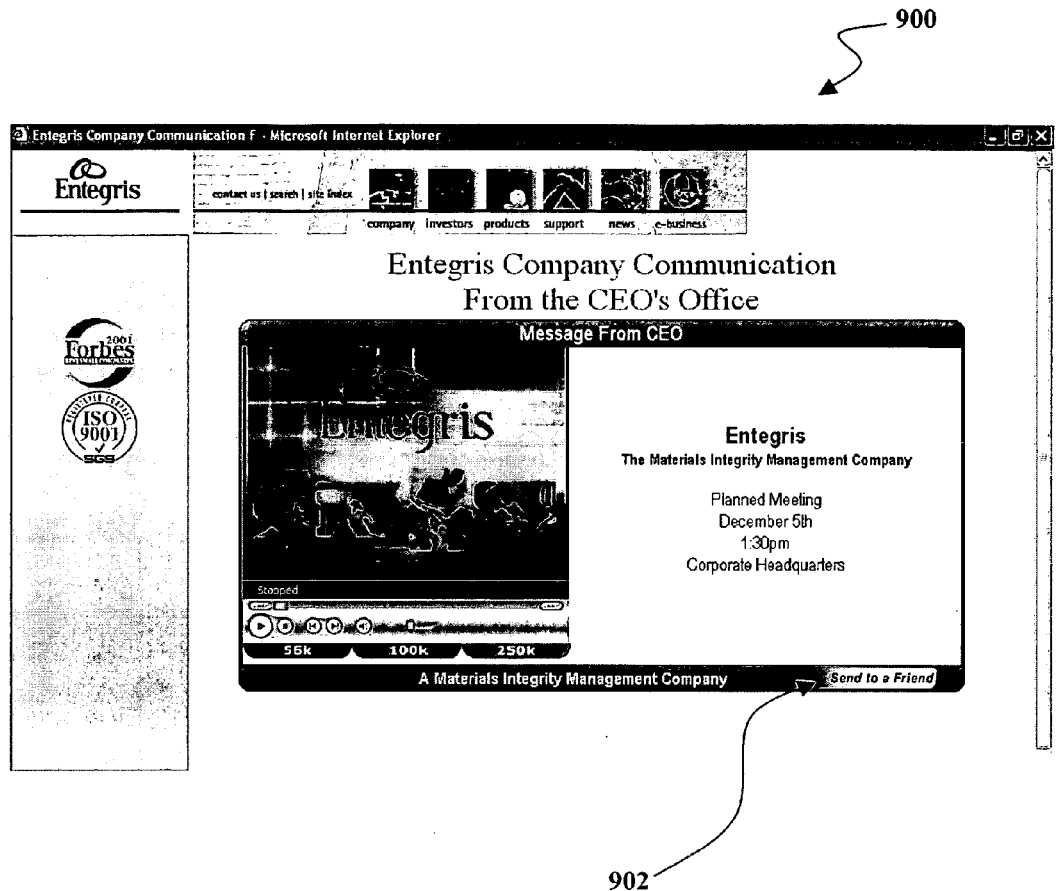
FIG. 9 is a web page according to one embodiment of the invention.

Content can also be linked to a private or semi-private web site 900, for example a corporate intranet system for employees and customers as in FIG. 9. From this page, a feature is available in one embodiment to allow users to direct others to the particular page carrying the rich media content by selecting a "send to a friend" option 902. After a user selects option 902, a rich media email message is sent from the user to the desired recipient or recipients. The same or similar diagnostics can be performed with respect to the recipient(s) to determine a compatible rich media content format. The "send to a friend" feature can also be made available from within email messages or from public or other web sites.

In one embodiment of a third phase 340 of method 300, computer system 10 in cooperation with the rich media system software tool streams files on distributed web pages from high availability server system 60. Media content embedded in a flyer is streamed as the content is accessed by a recipient at step 342. From the recipient's perspective, the media content plays in the context of a custom web page. Computer system 10 preferably includes diagnostic tools to survey a recipient system 40, 42, and 44, determine whether the system meets certain minimum specifications, and deliver the content in one of several different video streams depending upon the recipient system's 40, 42, and 44 configuration and bandwidth. In one embodiment, when a recipient opens a video mail message and selects the rich media content, typically via a button or link, the diagnostic tools automatically determine the appropriate program or programs required to deliver the selected rich media content to the recipient's particular platform. When changes in available bandwidth or other delivery characteristics occur during delivery and are detected by the diagnostic tools, streaming, for example a bit rate, is adjusted to minimize start-up time and buffering. In one embodiment, help screens are accessible to recipients in case of problems.

At step 344, media content linked to a web site is streamed. The diagnostic tools described above with reference to step 342 are also available and are used to deliver the content in the most appropriate video stream and monitor the streaming content for changes in bandwidth that affect successful receipt and viewing.

Figure 10:
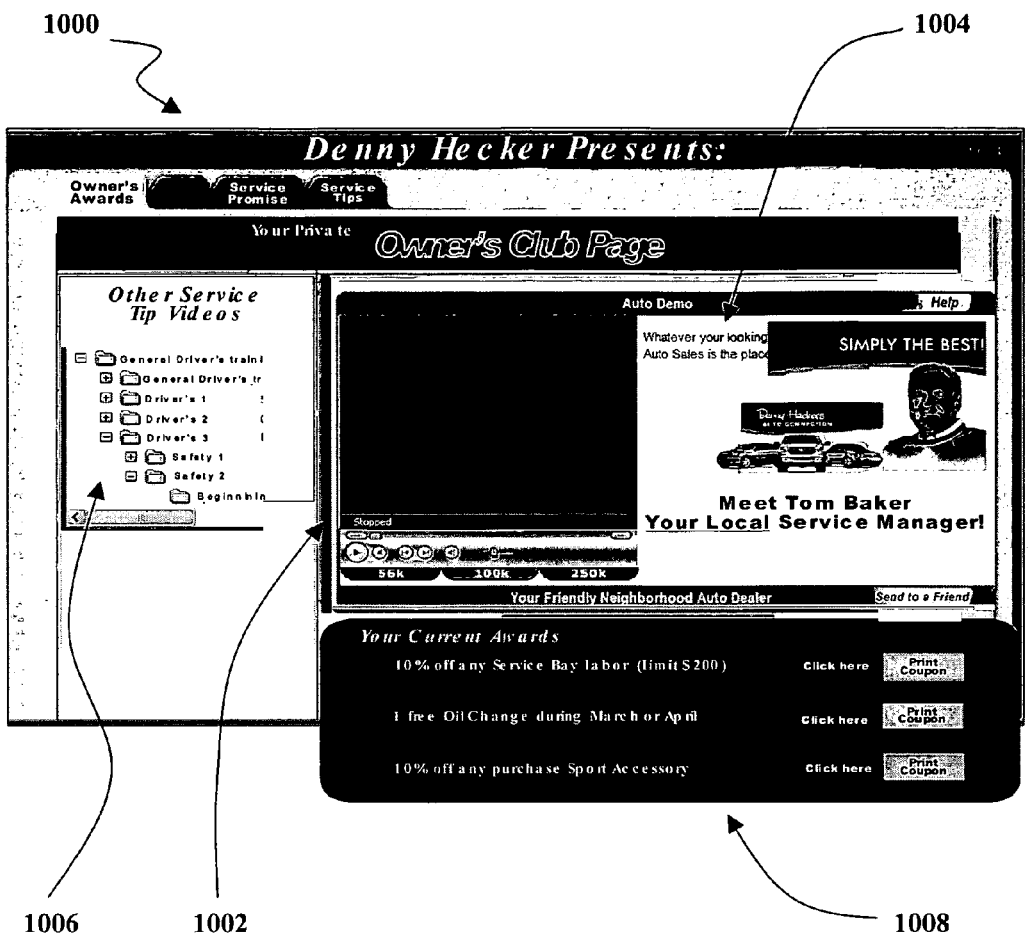
FIG. 10 is a web page according to one embodiment of the invention.

The rich media presentation system and method of the invention further enable a user to personalize rich media content on a web site as a commercial or video advertisement. For example, a service professional having a business web site for information and advertising purposes can include a brief video statement on their web site for existing or potential clients or customers, and a business can post product demonstration or service-related information on their web site or provide the same content directly to targeted customers or groups via email, as shown in FIG. 10. Semi-private page 1000 includes video content 1002 with an associated message 1004. Page 1000 also enables a recipient to select and view any of a variety of videos via index 1006 and includes personalized content 1008, here a coupon offer presented as an award. A business or other organization can further utilize the system for cause-related marketing to outside customers and clients, or for the distribution of key messages and business processes internally.

Training features can be included to assist businesses and organizations with successful implementation of rich media use as described herein. A business organization desiring to use rich media for advertising, marketing, and corporate message dissemination and microcasting internally and externally can appoint a particular content manager charged with overseeing creation, use, and management of rich media content. The content manager can receive particular on- or off-site training regarding the use of computer system 20 in cooperation with network system 30 and management system 32. After system set-up, including local implementation of the necessary system code and installation of system 20, the content manager can be provided with username and password access at a system 20 portal. The content manager can then create and/or publish rich media content to any folder level and facilitate use of the rich media content on a corporate web site or publish the content in a library page for email distribution or access by a sales force or other group. In one embodiment, the library can include training or best practices pages to provide additional support.

The system and method of the invention may further include a rich media inquiry response function. The inquiry response function enables a user to send a personalized and customized rich media inquiry response flyers or messages to a particular information inquiry. For example, a retailer having a web site can receive product and general information inquiries from potential customers via email or by phone. The system of the invention enables the retailer, through the library stored on server 60 and the management page of management server 32, to respond to customer requests with a customized flyer and email message comprising a specific response to the customer's inquiry and more general retailer-related rich media content.

In one particular example, an automotive dealership utilizing rich media for informative and advertising purposes has a web site through which potential buyers can view vehicle makes and models and other related dealership information and advertisements. A potential buyer visits the web site and sends an email inquiry to the dealership regarding the availability of a particular vehicle model in a specific color. When the dealership receives the email inquiry, a salesperson can create a rich media response message, for example a video mail flyer, that includes a text section in which the salesperson composes a personalized response to the potential customer's particular inquiry and a video highlighting the dealership and the services it offers in general. In other embodiments, original and personalized content is created for insertion into the flyer. For example, a salesperson can create a video highlighting the features of a particular vehicle about which a potential customer inquired.

Figure 11:
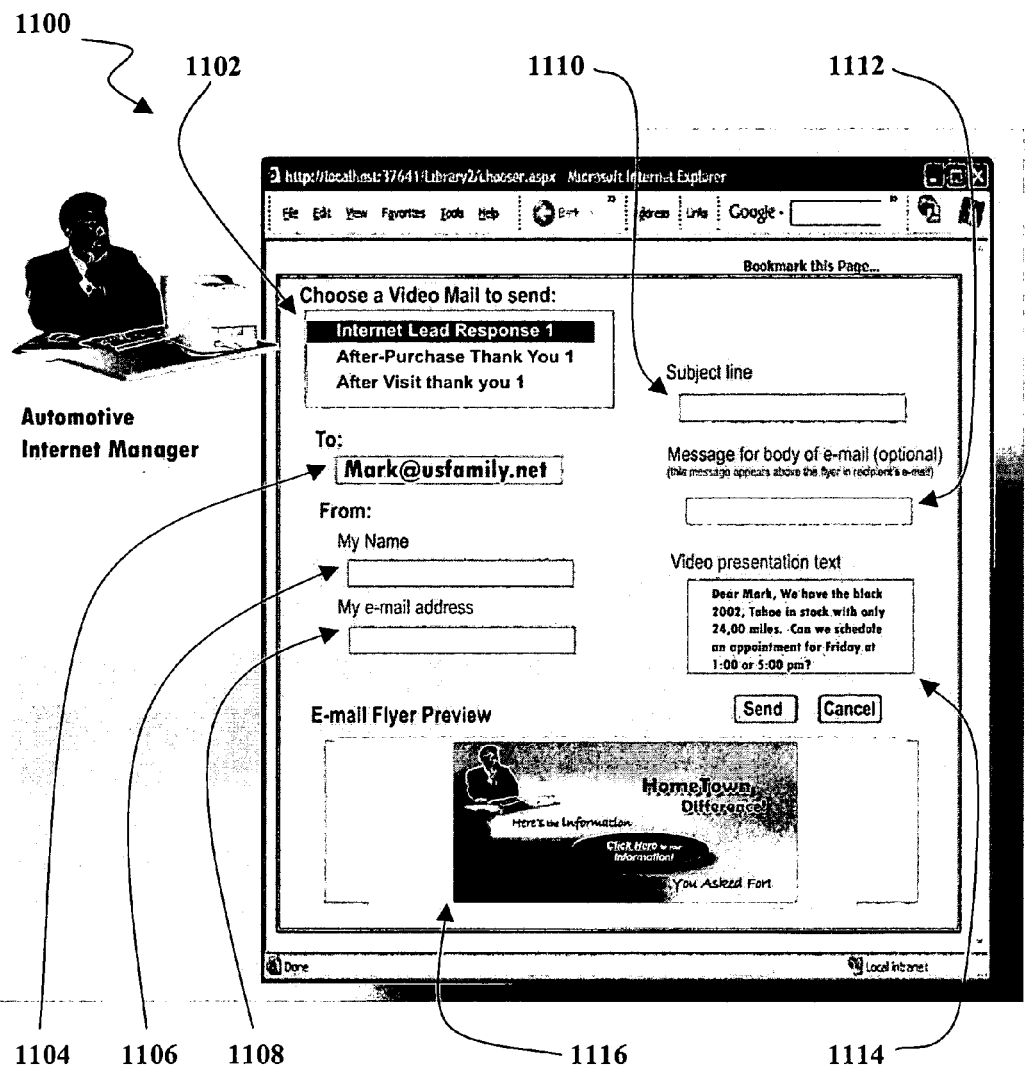
FIG. 11 is a management page according to one embodiment of the invention.

FIG. 11 is a screen capture of one exemplary embodiment of a management page 1100 that can be used by a salesperson or automotive Internet manager to create a personalized rich media response flyer. Management page 1100 includes a video selection menu 1102 and message customization fields, including an email address field 1104, sender name and address fields 1106 and 1108, subject line field 1110, and body field 1112. Management page 1100 also includes a video presentation text field 1114 in which the salesperson can include text to be displayed next to the video content in the flyer. As the flyer is created and customized, the salesperson can preview the flyer within management page 1100 in a preview window 1116.

Figure 12:
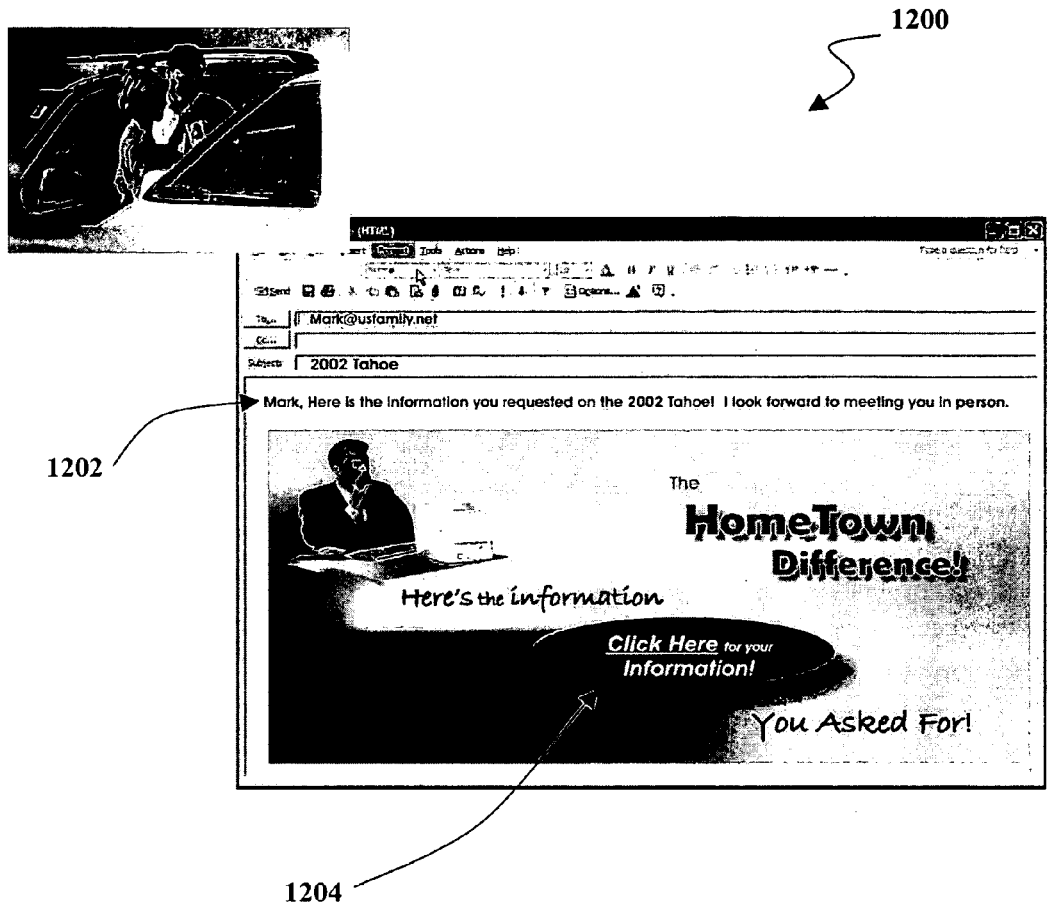
FIG. 12 is a response message according to one embodiment of the invention.
Figure 13:
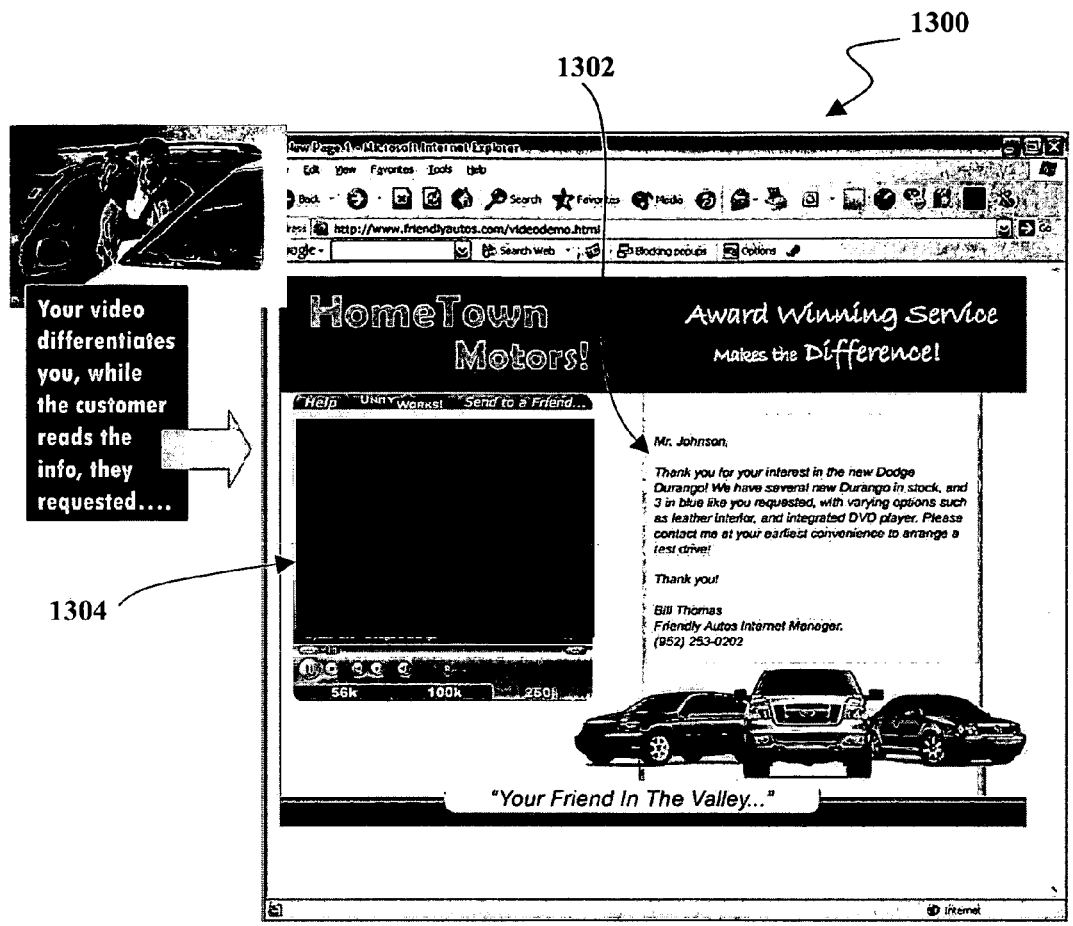
FIG. 13 is a customized response according to one embodiment of the invention.

FIG. 12 depicts an exemplary video mail response message 1200 that has been customized to respond to a particular customer inquiry. Message 1200 includes a personalized e-mail body message 1202, entered by the salesperson in body field 1112 of management page 1100. Message 1200 also includes a link 1204 to video content and to the particular inquiry response composed by the salesperson. When the video mail response message is received by the potential customer and the customer uses link 1204 to access and view the video content, the potential customer can read the salesperson's response 1302 to the specific inquiry while the video 1304 is played in screen 1300 of FIG. 13. Other management page 1100, response message 1200, and screen 1300 formats and arrangements can also be used without departing from the spirit or scope of the invention disclosed herein.

The rich media presentation system and method of the invention also include a secure content library (SCL) feature in one embodiment to assist in organizing and managing library content and provide an elevated level of security. The SCL feature preferably includes the standard rich media library features described herein above in addition to unique characteristics for improving organization and security.

The SCL user interface preferably comprises a tree view of nodes. The tree view provides a hierarchical view of the content in a set of libraries. A user can drill down to a specific library and view the content in that library as individual leaf items. Each leaf is the title of a rich media content item contained in the library in one embodiment. When the user selects the content, the content window plays the video within the content. At any time, the user can select alternate content at any tree level and the newly selected content will immediately begin loading. A rich media content manager can also name and rename the libraries and content as necessary or desired. In one embodiment, an interactive text-based chat feature is also available.

One aspect of the SCL feature protects rich media content stored in system libraries and on system servers as previously described from unauthorized distribution. For example, particular users can be authorized or have permitted access to a web page featuring rich media content, referred to as a rich media content presentation page or video presentation page (VPP). The VPP can include video or other rich media content and also includes system-provided page validation code and element objects.

The SCL feature of the invention protects the page content from unauthorized distribution, even by authorized clients/users, using encryption and dynamic script delivery to restrict access to content to only the configured VPP. As a result, the video or other rich media content will play only if the VPP is displayed in a browser. The uniform resource locator (URL) contained in the VPP that causes the rich media content to play will not work if used from the browser's window or from a different web page. In other words, the VPP security effectively controls access to the video or other rich media content and users with permitted access to the content cannot distribute functional content, for example as an email link.

Figure 14:
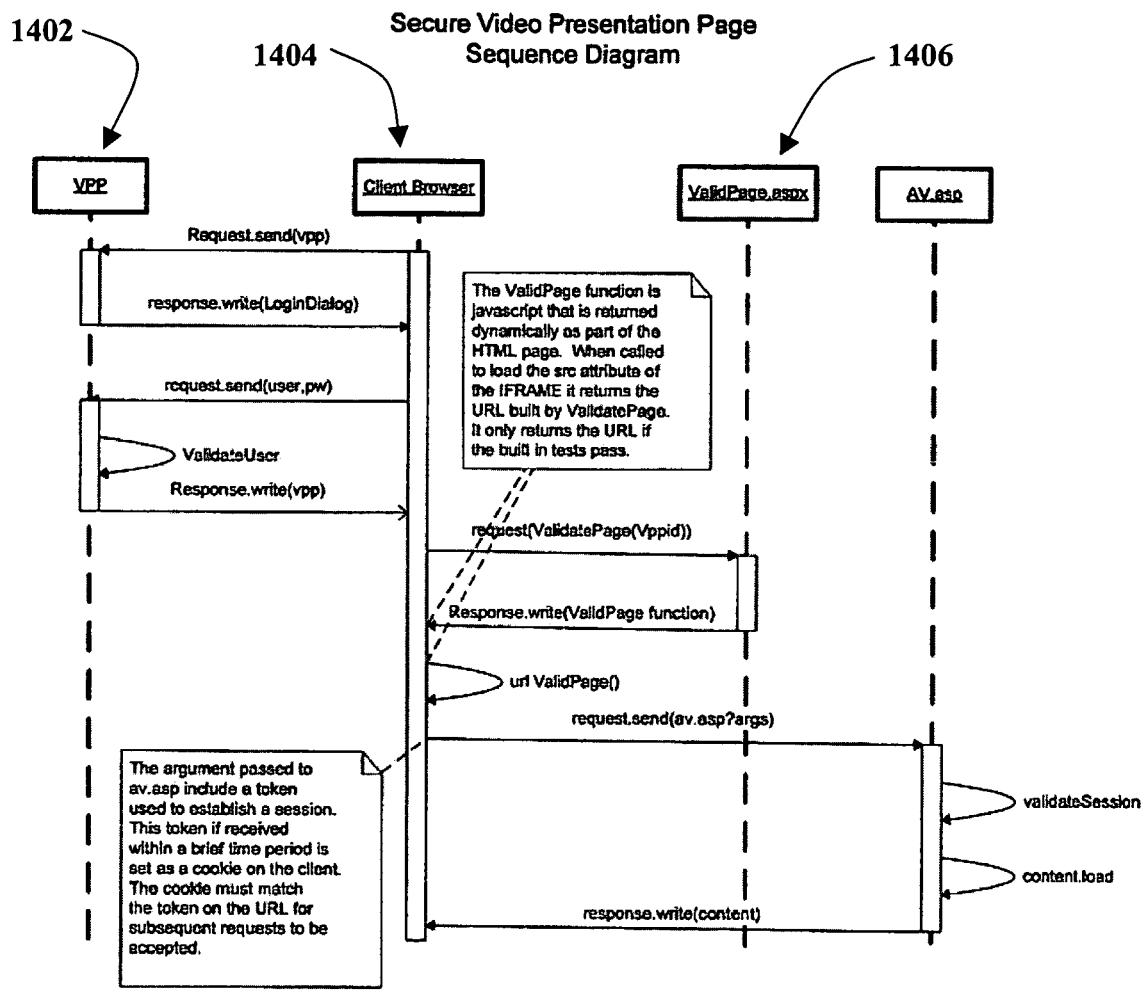
FIG. 14 is a diagram of a secure content library feature according to one embodiment of the invention.

FIG. 14 is a sequential diagram of one embodiment of the SCL feature of the invention. In one embodiment, the SCL feature begins with robust encryption. This encryption is preferably used at two points in the SCL feature technology: the URL used to include content from a system library and server in VPP 1402, and a token used to establish a client browser session 1404 with the system server. The URL included in the VPP has an encrypted identifier that is used with the system server to determine the configuration of VPP 1402. The configuration provides information including the VPP server domain and page name, and a system client identifier.

The SCL feature first verifies that the referring page, VPP 1402, is hosted by the correct system server and has the correct page name. If the page is verified, an encrypted session token is returned to the client as a session cookie. This cookie must be on the client for any video or other requested rich media content from the page to play. If the session cookie is not present, a "page not found" error is returned to the requester, thereby informing the requester that the page does not exist rather than that the page is secured. The SCL feature therefore enables rich media system customers to provide video and other rich media content on a web page that requires authentication for access, controlling distribution of the video or content.

For example, an initial load of VPP 1402 calls the system web service ValidatePage to load a dynamic JAVASCRIPT function that provides a ValidPage method (1406). The ValidPage method is called by the IFRAME script to dynamically load the IFRAME source with the video or other rich media content URL. The IFRAME and/or VPP code can be auto-generated, copied, and pasted by a web programmer from page 600, as previously discussed. The URL includes the session token used to establish a session, as previously described. The token is preferably encrypted. For example, the token can be encrypted with the Rijndael Advanced Encryption Standard (AES) symmetric encryption algorithm. The AES algorithm uses two private keys that are preferably secured at system servers. Other encryption algorithms and techniques can also be used in other embodiments. The token life is that of a browser session and is only valid from within that browser instance. Accordingly, if a link to the content is copied and sent by email, or any other means, the link will not work and the content will remain protected for authorized users. System content therefore remains protected.

Figure 15:
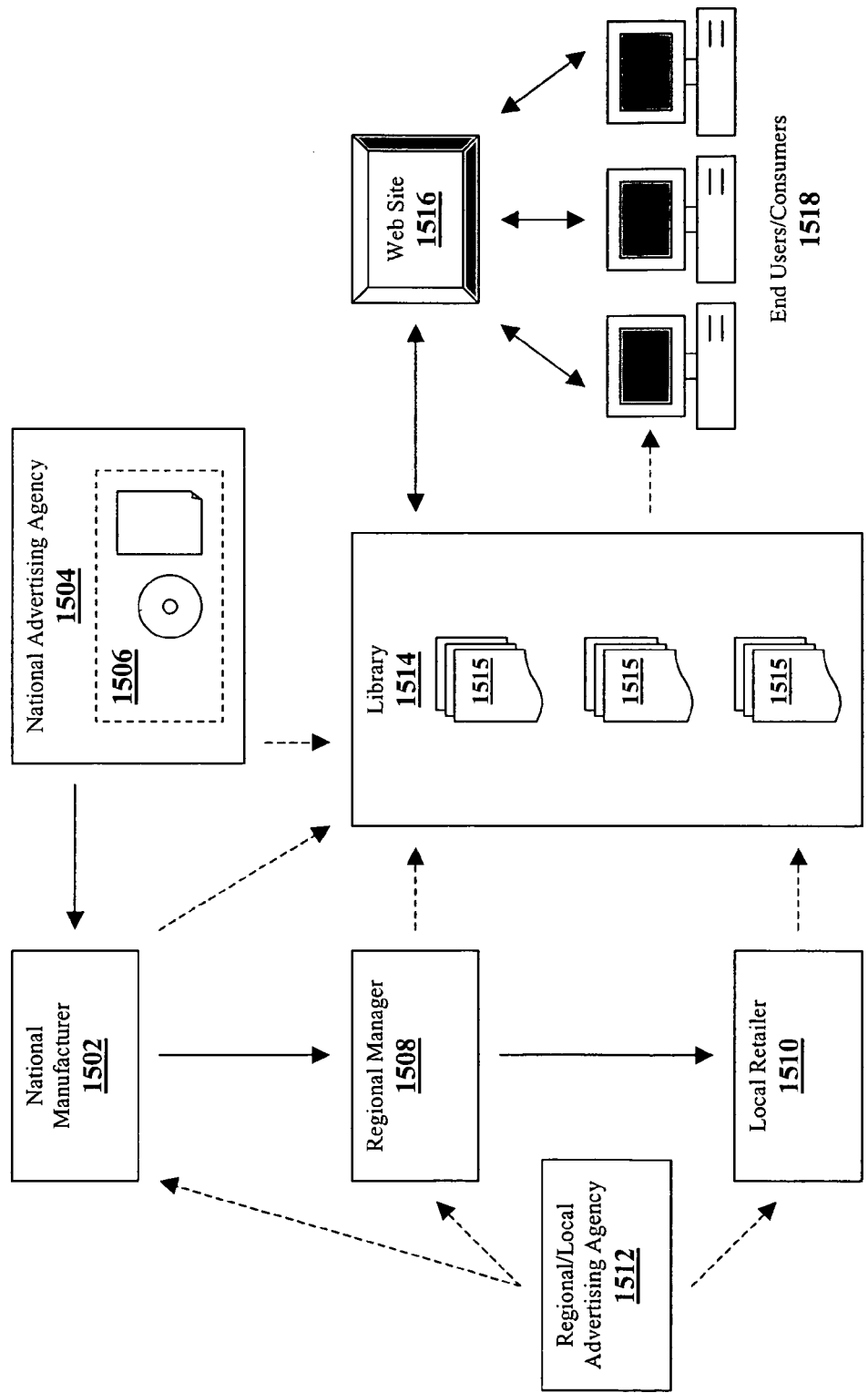
FIG. 15 is a diagram of a multi-level content application of one embodiment of the invention.

The system and method of the invention can also be implemented to provide multi-level content applications. A diagram of one embodiment of a multi-level content application is depicted in FIG. 15, wherein content from national, regional, and/or local levels is captured, stitched, encoded, and uploaded to a system library for publishing and dissemination.

For example, a national manufacturer 1502 works with a national advertising agency 1504 to develop advertising content 1506. Content 1506 can include video, text, printed media, visual or auditory clips, brochures, and the like, for use in advertising in any format. Content 1506 preferably has applicability in computer, Internet, and email, but also in newspaper and magazine, television, computer and Internet, radio, billboard and signage, direct mailing, and other advertisements. National manufacturer 1502 can be a producer of goods, for example an automotive manufacturer, clothing manufacturer, food and beverage company, retail or restaurant chain, and the like. National manufacturer 1502 can also be an airline, an insurance company, or some other provider or producer of goods and services. For purposes of example and illustration only, national manufacturer 1502 is an automobile manufacturer in this embodiment.

Nationwide content 1506 can be approved by manufacturer 1502 for dissemination to regional and local locations for use in advertising or other customer applications. Regional manager 1508 is a zone manager and local retailer 1510 is an automotive dealership in this exemplary automotive embodiment. In other embodiments, multiple regional managers 1508 at varying levels may exist, or manufacturer 1502 can directly communicate with and disseminate copy 1506 to local outlets 1510. Additionally, regional and/or local advertising agencies 1512 can provide content, either directly to regional manager 1508 and local retailer 1510, or for approval by national manufacturer 1502. In the automotive manufacturer example, national agency 1504 can produce and provide content 1506 relating to a particular vehicle or line, while local agencies 1512 can produce and provide content customized for regional audiences, for example use of the vehicle in a specific climate or environment applicable to that region or including features or offers not available in all areas.

The content from each level, be it national, regional, or local, is then encoded and uploaded to library 1514. Library 1514 can be a single library or preferably a plurality of distributed libraries for organizing and storing content as previously described. In one embodiment, content is organized into one or more groupings, profiles, or "schemas" 1515 in which the encoding and uploading of the content is optimized according to some factor. The factor may be an end user/recipient system characteristic according to advertising targets, an audience market segment characteristic, a target recipient characteristic, or a combination of more than one of these or other factors. In one particular example, schemas 1515 are selectively optimized in encoding and uploading based upon characteristics of a particular market segment. This enables the content to reach the most end users with the highest quality. Market segments can be initially optimized or re-optimized on the fly.

For example, a particular market segment can be identified according to the handheld device its members use to access the Internet when away from a home or office computer. Content can be optimized during encoding and uploading for viewing on the particular device under typical or general conditions. As new handheld devices are rolled out or market segment characteristics change, schema 1515 associated with this market segment can be re-optimized to accommodate the new devices, communication methodologies, and/or characteristics. In another example, schemas 1515 can be re-optimized according to feedback from schema targets (particular end users/consumers 1518) or other factors as needed or desired.

The uploaded content can be "stitched" to create Internet, email, and other rich media advertising or messaging. Stitching is a technique for connecting disparate rich media files, for example video files. In one embodiment, a stitching process comprises connecting video content in a sequential fashion to create and provide smooth, continuous play for a user viewing the content. In another application, video files are encoded in sequence to allow automatic stitching and/or seamless transitions between scenes, clips, or sections. Stitched output files can then be served centrally from any web server or through a content delivery network (refer, for example, to FIG. 2) for improved quality of experience.

Stitched content can be made available for upper level approval prior to local level use and dissemination. The stitched content is preferably approved by a higher level, in this embodiment national manufacturer 1502 and/or regional manager 1508, for wide dissemination and use by any level.

Stitched content customized for local audiences or schemas can also be viewed by national manufacturer 1502 or another higher-level approver at each encoded/uploaded speed and setting as it would be viewed by end users having various system configurations to confirm overall quality. As previously described, the rich media content can then be distributed on a website 1516 or directly to end users 1518 via email. In one embodiment, the rich media content can be tagged, labeled, or tracked for metadata extraction and analysis, annotation, selection/expiration, and statistical analysis. This information is or can be considered in the assembly, optimization, and re-optimization of one or more relevant schemas.

The managed rich media system and method of the invention enable a high level of management and control over rich media content while providing a variety of distribution and publication options and formats. The system and method can also permit password-controlled access by a sales force or other employees to the system and library to enable distribution of key product information, advertisements, and/or messages. Further, the system is able to encode rich media components and make the content available to a variety of recipient systems, regardless of system specifications or component format.

The invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. An automated method for managing multi-level rich media content associated with a product over a plurality of computer systems comprising the steps of:
   receiving first and second levels of rich media content at a first computer system, wherein
   the first level of rich media content is related to a first aspect of the product and created by a first source, and
   the second level of rich media content is related to a second aspect of the product, and is customized by a second source in connection with the first aspect of the product;
   encoding the first and the second levels of rich media content into a plurality of computer readable data formats optimized according to at least one factor;
   automatically stitching together the encoded first and second levels of rich media content in each of the plurality of computer readable data formats, customized in accordance with one or more of at least one schema, to create corresponding rich media message in different versions each of which is compatible with a recipient computer system, wherein the rich media message characterizes the product in terms of both the first and second aspects of the product in a seamless manner;
   receiving a request related to the product from a recipient computer system in proximity with the second source;
   selecting, a version of the rich media message that is appropriate for the recipient computer system; and
   transmitting the selected version of the rich media message to the recipient computer system in response to the request.

2. The method of claim 1, further comprising the step of tagging the first and second levels of rich media content for metadata extraction and analysis.

3. The method of claim 2, wherein the at least one factor is related to the metadata extraction and analysis.

4. The method of claim 1, wherein the at least one factor is related to the characteristics of at least one of a recipient computer system, a market segment, a device used by a recipient, bandwidth available to a network or a device used by a recipient, content that a recipient is current reviewing, a target recipient, or any combination thereof.

5. The method of claim 1, further comprising the step of re-optimizing the first and second levels of rich media content in the at least one schema according to a second factor.

6. The method of claim 5, wherein the second factor is the same as the at least one factor.

7. The method of claim 5, further comprising the steps of:
   receiving feedback from the recipient computer system; and
   selecting the second factor based at least in part on the feedback.

8. The method of claim 5, wherein the second factor is related to the characteristics of at least one of a new recipient device, a new communication methodology, a new market segment, or a new target recipient.

9. The method of claim 1, wherein the step of transmitting the selected version of the rich media message to the recipient computer system further comprises diagnosing the recipient computer system to determine a characteristic of the recipient computer system compatible with one of the plurality of computer readable data formats.

10. The method of claim 9, wherein the rich media message corresponds to a flyer having an executable icon link to selected version of the rich media content.

11. The method of claim 10, wherein the step of transmitting includes streaming the selected version of the rich media content to the recipient computer system after the executable icon link is selected.

12. The method of claim 11, wherein the step of streaming comprises:
   detecting a change in a delivery characteristic during streaming; and
   adjusting the streaming based on the detected change.

13. The method of claim 12, wherein the step of detecting a change in a delivery characteristic comprises detecting a change in available bandwidth.

14. The method of claim 1, further comprising the step of approving the stitched first and second levels of rich media content before transmitting the selected version of the rich media message.

15. The method of claim 1, wherein the the selected version of the rich media message is transmitted via a web site.

16. The method of claim 1, wherein the first or second level of rich media content includes content related to a geographical region of the at least one recipient computer system.

17. The method of claim 16, wherein the content includes information relating to the climate of the geographical region.

18. An automated method of securing a rich media content library system on a computer system comprising the steps of:
   receiving first level and second level of rich media content at a first computer system, wherein
   the first level of rich media content is related to a first aspect of the product and created by a first source, and
   the second level of rich media content is related to a second aspect of the product, and is created and customized by a second source in connection with the first aspect of the product;
   encoding the first and the second levels of rich media content into a plurality of computer readable data formats optimized based on at least one factor;
   automatically stitching together the encoded first and second levels of rich media content in each of the plurality of computer readable data formats, customized in accordance with one or more of at least one schema, to create corresponding rich media message in different versions each of which is compatible with a recipient computer system, wherein the rich media message characterizes the product in terms of both the first and second aspects of the product in a seamless manner;

linking the rich media message to a web page accessible to at least one recipient computer system;

encrypting a uniform resource locator associated with the web page;

receiving a request related to the product from one of the at least one recipient computer system in proximity with the second source;

selecting a version of the rich media message that is appropriate for the recipient computer system; and transmitting the selected version of the rich media message to the recipient computer system in response to the request.

19. The method of claim 18, wherein the step of transmitting the selected version of the rich media message comprises the steps of:

diagnosing the recipient computer system to determine a characteristic of the recipient computer system compatible with one of the plurality of computer readable data formats; and streaming the requested rich media message to the recipient computer system in one of the plurality of computer readable data formats determined to be compatible with the recipient computer system.

20. The method of claim 18, further comprising the steps of:

receiving a second request from the recipient computer system for a rich media message linked to the web page;

distributing the rich media message to the recipient computer system if certain information related to the web page is verified.

21. The method of claim 18, wherein the step of encrypting a uniform resource locator associated with the web page comprises selecting and copying automatically generated code associated with the rich media message from the computer library into the web page.

22. The method of claim 18, wherein the first or second level of rich media content includes content related to a geographical region of the at least one recipient computer system.

23. The method of claim 22, wherein the content includes information relating to the climate of the geographical region.

* * * * *